US012386044B2

(12) United States Patent
Jin et al.

(10) Patent No.: US 12,386,044 B2
(45) Date of Patent: Aug. 12, 2025

(54) TIME-OF-FLIGHT SENSOR AND METHOD OF MEASURING DISTANCE USING THE SAME

(71) Applicant: SAMSUNG ELECTRONICS CO., LTD., Suwon-si (KR)

(72) Inventors: Younggu Jin, Osan-si (KR);
Youngchan Kim, Seongnam-si (KR);
Yonghun Kwon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1141 days.

(21) Appl. No.: 17/244,051

(22) Filed: Apr. 29, 2021

(65) Prior Publication Data
US 2022/0043116 A1 Feb. 10, 2022

(30) Foreign Application Priority Data

Aug. 6, 2020 (KR) ........................ 10-2020-0098448

(51) Int. Cl.
*G01S 7/484* (2006.01)
*G01B 11/22* (2006.01)
(Continued)

(52) U.S. Cl.
CPC .............. *G01S 7/484* (2013.01); *G01B 11/22* (2013.01); *G01S 7/4816* (2013.01);
(Continued)

(58) Field of Classification Search
CPC .......... G01S 17/06; G01S 17/08; G01S 17/26; G01S 17/32; G01S 17/36; G01S 17/58; G01S 7/481; G01S 7/484; G01S 7/4816; G01S 7/4861; G01S 7/4911; G01S 7/4914; G01S 7/4915; G01S 17/894; G01B 11/22
See application file for complete search history.

(56) References Cited

U.S. PATENT DOCUMENTS

| 8,537,218 | B2 * | 9/2013 | Kawahito | ......... H01L 31/02024 |
| | | | | 348/140 |
| 8,964,047 | B2 | 2/2015 | Robinson et al. | |

(Continued)

FOREIGN PATENT DOCUMENTS

CN 110221272 A * 9/2019 ........... G01S 7/4866

*Primary Examiner* — Luke D Ratcliffe
(74) *Attorney, Agent, or Firm* — Wolf, Greenfield & Sacks, P.C.

(57) ABSTRACT

A method measures the distance between a time-of-flight (ToF) sensor and an object based on cross time shift. The ToF sensor includes at least one depth pixel and a light source to direct transmission light to an object. The depth pixel may have a multi-tap structure and may generate sampled data based on reception light and demodulation signals having different phases. The reception light corresponds to the transmission light reflected from the object. The method includes generating time shifts between the transmission light and demodulation signals, performing sampling operations to generate the sampled data corresponding to the time shifts, determining a cross time shift based on sampled data of a first reference tap substantially equaling sampled data of a second reference tap, and determining the distance between the ToF sensor and the object based on the cross time shift.

20 Claims, 31 Drawing Sheets

(51) Int. Cl.
  *G01S 7/481* (2006.01)
  *G01S 7/4911* (2020.01)
  *G01S 17/06* (2006.01)
  *G01S 17/58* (2006.01)
  *G01S 17/894* (2020.01)

(52) U.S. Cl.
  CPC ............ *G01S 7/4911* (2013.01); *G01S 17/06* (2013.01); *G01S 17/58* (2013.01); *G01S 17/894* (2020.01)

(56) References Cited

U.S. PATENT DOCUMENTS

| | | |
|---|---|---|
| 9,684,075 B2 | 6/2017 | Xue et al. |
| 2017/0123067 A1 | 5/2017 | Van Der Tempel |
| 2019/0129033 A1 | 5/2019 | Iida et al. |
| 2019/0227169 A1 | 7/2019 | Wong |
| 2019/0293792 A1 | 9/2019 | Keel et al. |
| 2020/0028017 A1 | 1/2020 | Imoto et al. |
| 2020/0284883 A1* | 9/2020 | Ferreira ............... H04N 25/773 |
| 2020/0284885 A1* | 9/2020 | Miller .................... G01S 17/32 |

* cited by examiner

TIME-OF-FLIGHT SENSOR AND METHOD OF MEASURING DISTANCE USING THE SAME

CROSS-REFERENCE TO RELATED APPLICATION

This U.S. non-provisional application claims priority under 35 USC § 119 to Korean Patent Application No. 10-2020-0098448, filed on Aug. 6, 2020, in the Korean Intellectual Property Office (KIPO), the disclosure of which is incorporated by reference herein in its entirety.

BACKGROUND

1. Technical Field

Example embodiments relate to a time-of-flight sensor and a method measuring distance using a time-of-flight sensor.

2. Discussion of the Related Art

Various sensing technologies have been developed for acquiring three-dimensional information of an object. Some of these technologies involve the use of a three-dimensional camera which includes a time-of-flight (ToF) sensor. Such a sensor may illuminate an object with transmission light and then calculate a distance to the object, by measuring a phase difference of a flight time of light reflected from the object using demodulation signals. The accuracy of the resulting distance measurement may be degraded due various effects, including but not limited to offsets or gain deviations of depth pixels in the ToF sensor.

SUMMARY

Some example embodiments may provide a time-of-flight (ToF) sensor capable of enhancing accuracy of a distance measurement. Some example embodiments may also provide a method of measuring a distance using a ToF sensor.

In accordance with one or more embodiments, a method measures a distance using a time-of-flight (ToF) sensor, which includes at least one depth pixel and a light source illuminating a transmission light to an object. The depth pixel has a multi-tap structure including a plurality of taps to generate a plurality of sampled data based on a reception light and a plurality of demodulation signals having different phases. The transmission light is reflected from the object back to the ToF sensor as the reception light.

The method includes generating a plurality of time shifts between the transmission light and a plurality of demodulation signals, performing a plurality of sampling operations to generate the plurality of sampled data corresponding to the plurality of time shifts, determining a cross time shift based on the plurality of sampled data corresponding to the plurality of time shifts, such that the sampled data of a first reference tap and a second reference tap among the plurality of taps become substantially equal to each other with respect to the cross time shift; and determining a distance between the ToF sensor and the object based on the cross time shift.

In accordance with one or more embodiments, a method measures a distance using a time-of-flight (ToF) sensor, which includes at least one depth pixel and a light source illuminating a transmission light to an object. The depth pixel has a multi-tap structure including a plurality of taps to generate a plurality of sampled data based on a reception light and a plurality of demodulation signals having different phases. The transmission light is reflected from the object back to the ToF sensor as the reception light.

The method includes generating a first time shift between the transmission light and the plurality of demodulation signals, performing a first sampling operation to generate first sampled data corresponding to the first time shift, generating a second time shift between the transmission light and the plurality of demodulation signals, performing a second sampling operation to generate second sampled data corresponding to the second time shift, determining a cross time shift based on the first and second sampled data, such that sampled data of a first reference tap and a second reference tap among the plurality of taps become substantially equal to each other with respect to the cross time shift, and determining a distance between the ToF sensor and the object based on the cross time shift.

In accordance with one or more embodiments, a time-of-flight (ToF) sensor includes a light source configured to illuminate a transmission light to an object and a sensor including a pixel array and a row scanning circuit. The pixel array includes one or more depth pixels, each of the one or more depth pixels having a multi-tap structure including a plurality of taps configured to generate a plurality of sampled data based on a reception light and a plurality of demodulation signals having different phases. The transmission light is reflected from the object back to the ToF sensor as the reception light, and the row scanning circuit configured to generate the plurality of demodulation signals applied to the plurality of taps.

The ToF sensor also includes a controller configured to perform a plurality of sampling operations, by applying the plurality of demodulation signals having a plurality of time shifts with respect to the transmission light to generate the plurality of sampled data corresponding to the plurality of time shifts. In addition, the controller is configured to determine a cross time shift based on the plurality of sampled data corresponding to the plurality of time shifts, such that the sampled data of a first reference tap and a second reference tap among the plurality of taps become substantially equal to each other with respect to the cross time shift, and to determine a distance between the ToF sensor and the object based on the cross time shift.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
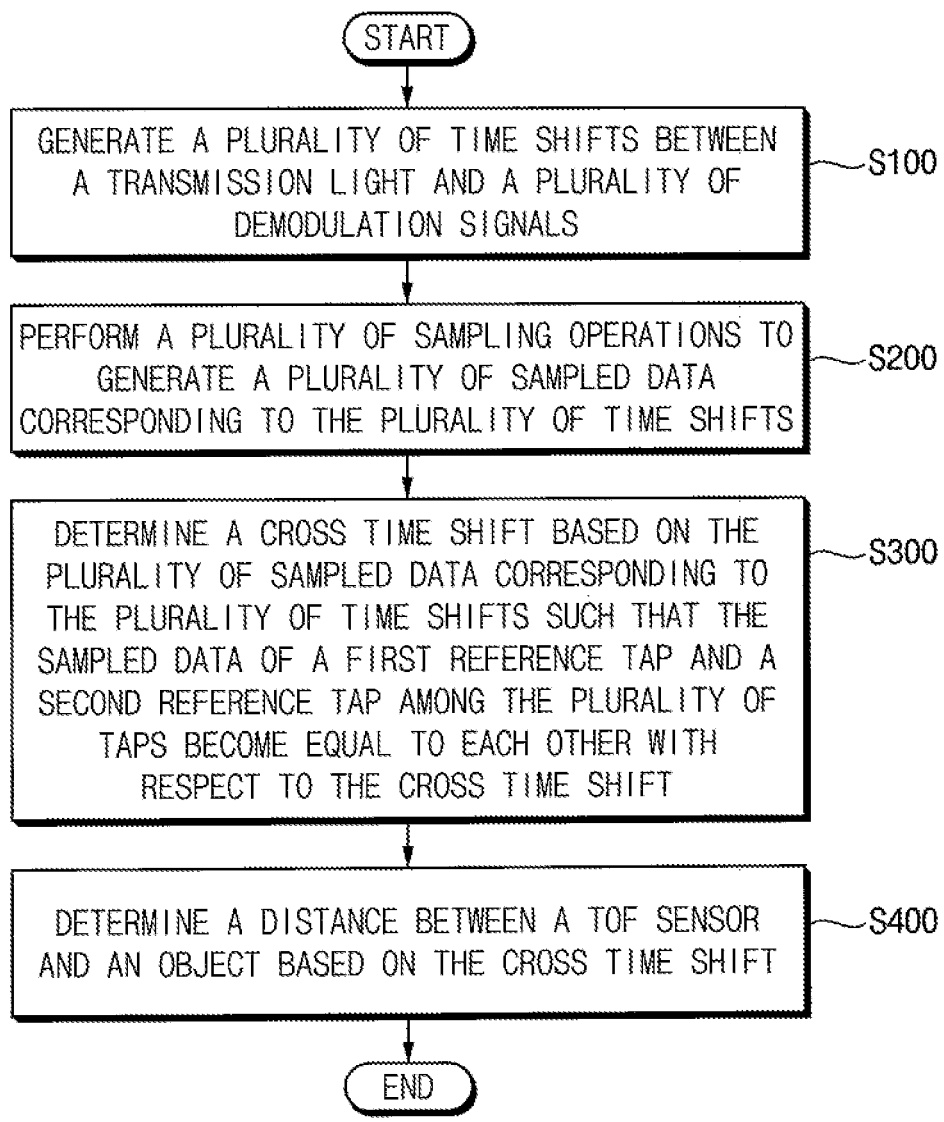
FIG. 1 illustrates an embodiment of a method of measuring distance using a ToF sensor.

Various example embodiments will be described more fully hereinafter with reference to the accompanying drawings, in which some example embodiments are shown. In the drawings, like numerals refer to like elements throughout. The repeated descriptions may be omitted. In accordance with one or more embodiments, the term "substantially" may correspond to a predetermined tolerance.

FIG. 1 is a flow chart illustrating a method of measuring distance using a time-of-flight (ToF) sensor according to example embodiments. According to example embodiments, the ToF sensor may include at least one depth pixel, and also may include or be coupled to a light source providing transmission light to illuminate an object. In one embodiment, the depth pixel may have a multi-tap structure (including a plurality of taps) to generate a plurality of sampled data based on reception light and demodulation signals having different phases. The reception light may correspond to the transmission light which has been reflected from the object back to the ToF sensor. The method of measuring distance according to example embodiments may be performed using such a ToF sensor.

Referring to FIG. 1, the method includes, at S100, generating a plurality of time shifts between the transmission light and a plurality of demodulation signals. The time shift may indicate a relative time difference or phase difference between the transmission light and the demodulation signals. In some example embodiments (e.g., described with reference to FIGS. 4 and 5), the time shift may be changed by adjusting a delay amount or phase of the transmission light and/or the demodulation signals. In some example embodiments (e.g., described with reference to FIGS. 19 and 20), the time shift may be changed by adjusting a pulse width or duty ratio of the demodulation signals.

At S200, a plurality of sampling operations may be performed to generate the plurality of sampled data corresponding to the time shifts. As described below, the sampling operation may be performed with various methods according to, for example, a tap structure of the depth pixel, a modulation scheme of the transmission light, and/or other features.

At S300, a cross time shift may be determined based on the plurality of sampled data corresponding to the plurality of time shifts, such that the sampled data of a first reference tap and a second reference tap among the plurality of taps become equal to each other with respect to the cross time shift.

At S400, the distance between the ToF sensor and the object may be determined based on the cross time shift. Example embodiments of determining the cross time shift and the distance calculation are described with reference to FIGS. 7 through 8F.

According to one method, a ToF sensor may determine the distance between the ToF sensor and an object based on a ratio of sampled data corresponding to the demodulation signals. Such a method may produce varying or inaccurate distance calculations depending on offsets or gain deviations of depth pixels in the ToF sensor.

According to example embodiments, a cross time shift corresponding to a cross point of sampled data may be determined based on a change in time shift. The cross time shift may then be used as a basis of determining the distance between the ToF sensor and the object. Using this approach and others described herein, an accurate distance may be obtained even when characteristic deviations of one or more depth pixels are varied. That is, by using a cross time shift determined based on a plurality of sampled data corresponding to the different time shifts, a ToF sensor and method of measuring distance according to example embodiments may enhance accuracy of distance measurements regardless of characteristic deviations of the depth pixel.

In some example embodiments (e.g., described with reference to FIGS. 22 and 23), access velocity of the object may be determined based on the plurality of sampled data corresponding to the plurality of time shifts. In this case, the sampled data may be corrected based on the access velocity and the cross time shift may be corrected based on the sampled data that are corrected. Thus, a ToF sensor and the method of measuring distance according to example embodiments may measure the access velocity of the object based on sampled data and accuracy of distance measurement may be further enhanced using the measured access velocity.

Figure 2:
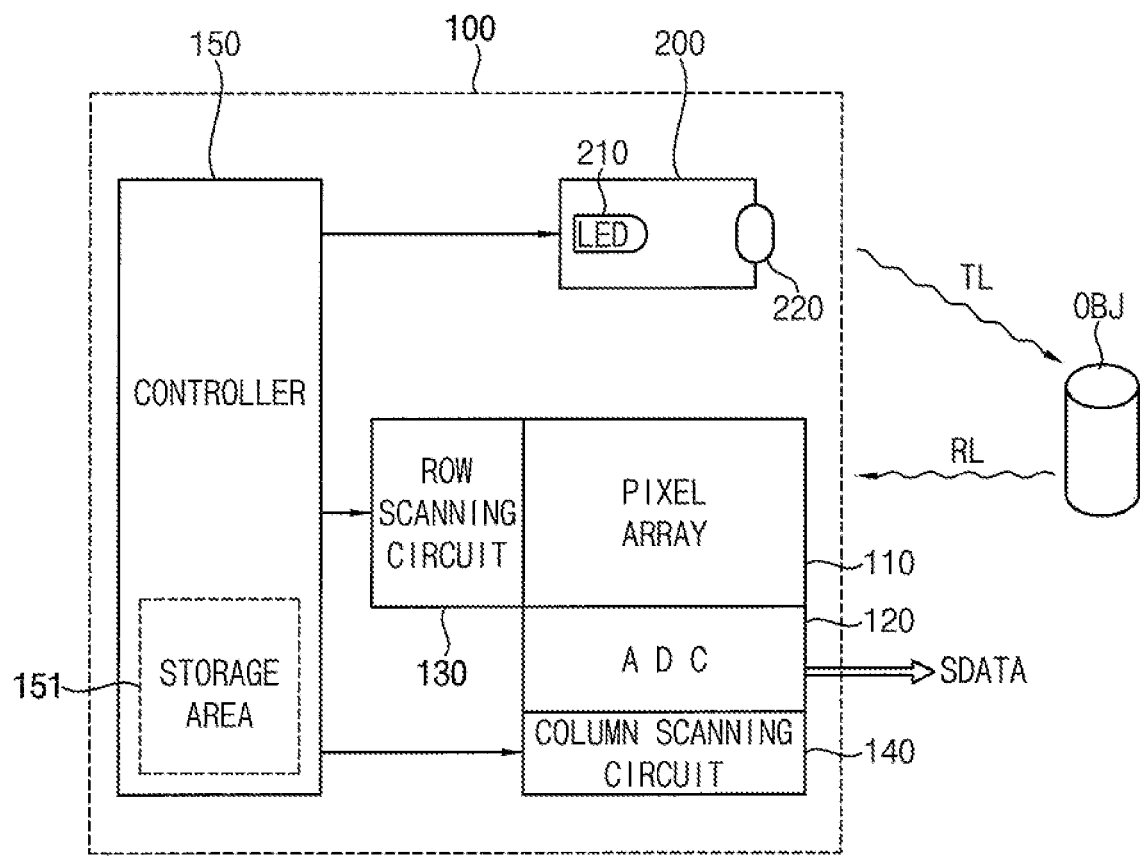
FIG. 2 illustrates an embodiment of a ToF sensor.

FIG. 2 is a block diagram illustrating an embodiment of a ToF sensor 100, which may include a sensing unit (sensor), a controller 150 and a light source module 200.

Referring to FIG. 2, the sensing unit (sensor) may include a pixel array 110, an analog-to-digital converter (ADC) unit 120, a row scanning circuit 130, and a column scanning circuit 140. The pixel array 110 may include one or more depth pixels that receive light RL reflected from an object OBJ. The light reflected from the object OBJ is based on light transmitted to the object OBJ by the light source module 200. The depth pixels may convert the reception light RL to electrical signals. The depth pixels may then provide information about a distance of the object OBJ from the ToF sensor 100.

In one embodiment, the pixel array 110 may include color pixels for providing color image information. In this case, the ToF sensor 100 may be a three-dimensional color image sensor that provides the color image information and depth information. According to example embodiments, an infrared filter and/or a near-infrared filter may be formed on the depth pixels and a color filter (e.g., red, green and blue filters) may be formed on the color pixels. According to example embodiments, the ratio of the number of the depth pixels to the number of the color pixels may vary as desired or by design.

The ADC unit 120 may convert an analog signal output from the pixel array 110 to a digital signal. According to example embodiments, the ADC unit 120 may perform a column analog-to-digital conversion that converts analog signals in parallel using a plurality of analog-to-digital converters respectively coupled to a plurality of column lines. According to example embodiments, the ADC unit 120 may perform a single analog-to-digital conversion that sequentially converts the analog signals using a single analog-to-digital converter.

According to example embodiments, the ADC unit 120 may include a correlated double sampling (CDS) unit for extracting an effective signal component. In some example embodiments, the CDS unit may perform an analog double sampling that extracts an effective signal component based on the difference between an analog reset signal including a reset component and an analog data signal including a signal component. In some example embodiments, the CDS unit may perform a digital double sampling that converts the analog reset signal and the analog data signal to two digital signals and extracts the effective signal component based on a difference between the two digital signals. In some example embodiments, the CDS unit may perform a dual correlated double sampling that performs both the analog double sampling and the digital double sampling.

The row scanning circuit 130 may receive control signals from the controller 150, and may control a row address and a row scan of the pixel array 110. To select a row line among a plurality of row lines, the row scanning circuit 130 may apply a signal for activating the selected row line to the pixel array 110. According to example embodiments, the row scanning circuit 130 may include a row decoder that selects a row line of the pixel array 110 and a row driver that applies a signal for activating the selected row line.

The column scanning circuit 140 may receive control signals from the controller 150, and may control a column address and a column scan of the pixel array 110. The column scanning circuit 140 may output a digital output signal from the ADC unit 120 to a digital signal processing circuit and/or to an external host. For example, the column scanning circuit 140 may provide the ADC unit 120 with a horizontal scan control signal to sequentially select a plurality of analog-to-digital converters in the ADC unit 120.

The controller 150 may control the ADC unit 120, the row scanning circuit 130, the column scanning circuit 140, and the light source module 200. The controller 150 may provide the ADC unit 120, the row scanning circuit 130, the column scanning circuit 140, and the light source module 200 with control signals, such as at least one of a clock signal, a timing control signal, or another signal. The controller 150 may include at least one of a control logic circuit, a phase locked loop circuit, a timing control circuit, a communication interface circuit, or another circuit.

The light source module 200 may emit light of a desired (or predetermined) wavelength. For example, the light source module 200 may emit infrared light and/or near-infrared light. The light source module 200 may include a light source 210 and a lens 220. The light source 210 may be controlled by the controller 150 to emit the transmission light TL of a desired intensity and/or characteristic (for example, periodic). For example, the intensity and/or characteristic of the transmission light TL may be controlled such that the transmission light TL has a predetermined, waveform, e.g., a pulsed wave, a sine wave, a cosine wave, or another type of wave. The light source 210 may be implemented by a light emitting diode (LED), a laser diode, or another type of light source.

Normal operation of the ToF sensor 100 according to example embodiments will now be described below.

The controller 150 may control the light source module 200 to emit transmission light TL having a periodic intensity. The transmission light TL emitted by the light source module 200 may be reflected from the object OBJ back to the ToF sensor 100 as reception light RL. The reception light RL may be incident on the depth pixels, and the depth pixels may be activated by the row scanning circuit 130 to output analog signals corresponding to the reception light RL. The ADC unit 120 may convert the analog signals output from the depth pixels to sampled data SDATA. The sampled data SDATA may be provided to the controller 150 by the column scanning circuit 140 and/or the ADC 120.

The controller 150 (or an external processor) may calculate the distance of the object OBJ from the ToF sensor 100, a horizontal position of the object OBJ, a vertical position of the object OBJ, and/or a size of the object OBJ based on the sampled data SDATA. The controller 150 may control the emission angle or a projection (or incident) region of the transmission light TL based on the distance, the horizontal position, the vertical position and/or the size of the object OBJ. For example, the controller 150 may control an interval between the light source 210 and the lens 220, a relative position (or a placement) of the light source 210 and the lens 220 with respect to each other, a refractive index of the lens 220, a curvature of the lens 220, or another feature of lens 220.

The transmission light TL illuminated to the object OBJ may be reflected, and the reflected light (e.g., reception light RL) may be incident on the depth pixels in the pixel array 110. The depth pixels may output analog signals corresponding to the reception light RL, the ADC unit 120 may convert the analog signals to digital data or the sampled data SDATA. The sampled data SDATA and/or the depth information may be provided to the controller 150, the digital signal processing circuit and/or the external host. According to example embodiments, the pixel array 110 may include color pixels, and color image information as well as the depth information may be provided to the digital signal processing circuit and/or the external host.

Figure 3:
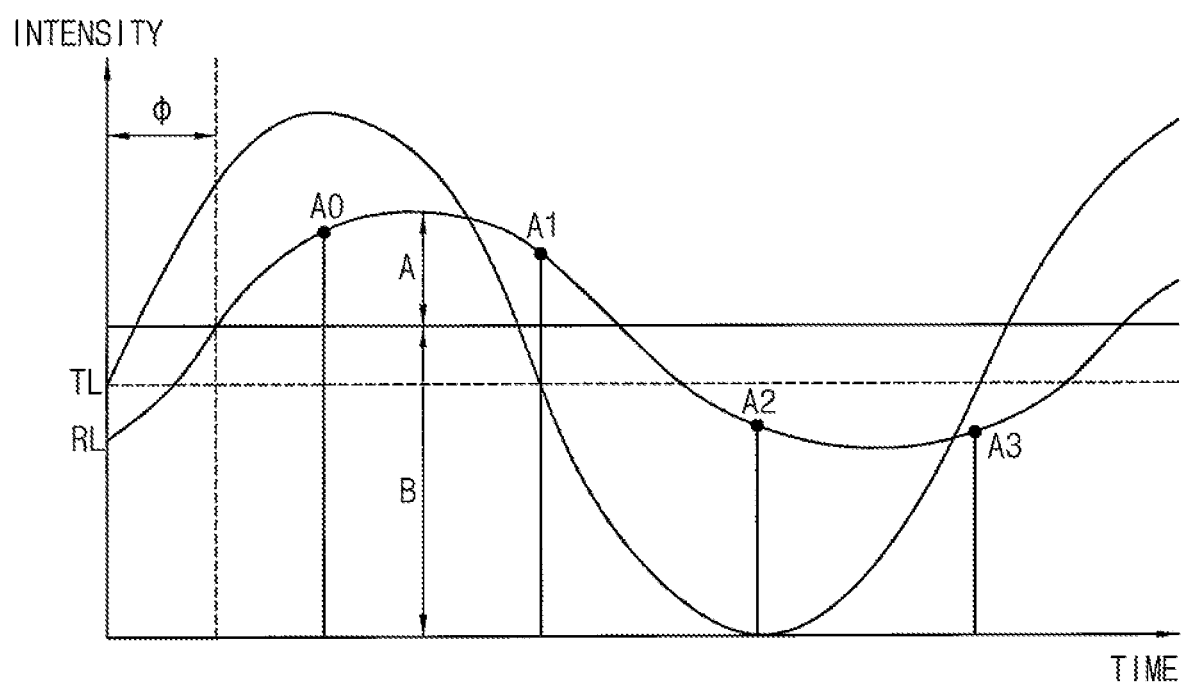
FIGS. 3 and 4 illustrate example methods of measuring and calculating distance to an object.
Figure 4:
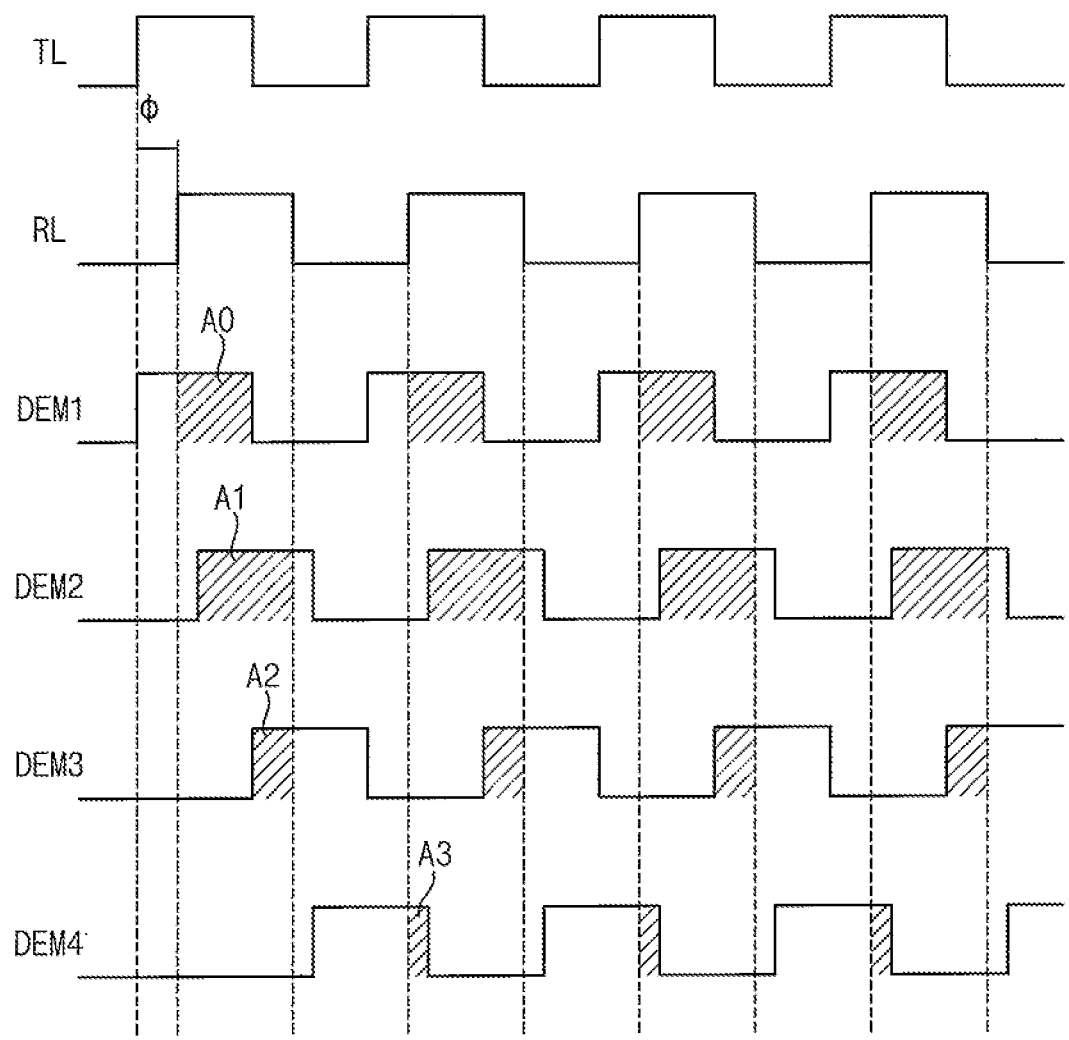

FIGS. 3 and 4 are diagrams for describing an example method of measuring and calculating a distance to an object according to an embodiment.

Referring to FIGS. 2 and 3, the transmission light TL emitted by light source module 200 may have a (e.g., predetermined) periodic intensity and/or characteristic. For example, the intensity (e.g., number of photons per unit area) of the transmission light TL may have a predetermined waveform, which in this example is a sine wave but may be a different type of waveform in another embodiment.

The transmission light TL emitted by the light source module 200 may be reflected from the object OBJ and then may fall incident on the pixel array 110 as reception light RL. The pixel array 110 may periodically sample the reception light RL. According to example embodiments, during each period of the reception light RL (which, for example, may correspond to a period of the transmitted light TL), the pixel array 110 may perform a sampling on the reception light RL by sampling, for example, at two sampling points having a predetermined phase difference (e.g., about 180 degrees), at four sampling points having a phase difference (e.g., of about 90 degrees), or at more than four sampling points. For example, the pixel array 110 may extract four samples A0, A1, A2 and A3 of the reception light RL, at phases of 0 degree, 90 degrees, 180 degrees and 270 degrees per period, respectively.

The reception light RL may have an offset B that is different from an offset of the transmission light TL emitted by light source module 200 due to background light, noise, and/or other effects. The offset B of the reception light RL may be calculated based on Equation 1.

$$B = \frac{A0 + A1 + A2 + A3}{4} \quad (1)$$

where A0 represents intensity of the reception light RL sampled at a phase of about 0 degrees of the emitted light TL, A1 represents intensity of the reception light RL sampled at a phase of about 90 degrees of the emitted light TL, A2 represents intensity of the reception light RL sampled at a phase of about 180 degrees of the emitted light TL, and A3 represents intensity of the reception light RL sampled at a phase of about 270 degrees of the emitted light TL.

The reception light RL may have amplitude A lower than that of the transmission light TL emitted by the light source module 200 due to loss (for example, light loss). The amplitude A of the reception light RL may be calculated based on Equation 2.

$$A = \frac{\sqrt{(A0 - A2)^2 + (A1 - A3)^2}}{2} \quad (2)$$

Black-and-white image information corresponding to the object OBJ may be provided by respective depth pixels in the pixel array 110 based on the amplitude A of the reception light RL.

In an example, reception light RL may be delayed by a phase difference ϕ corresponding to twice the distance of the object OBJ from the ToF sensor 100 with respect to the emitted light TL. The phase difference ϕ between the emitted light TL and the reception light RL may be calculated based on Equation 3.

$$\phi = \arctan\left(\frac{A0 - A2}{A1 - A3}\right) \quad (3)$$

The phase difference Φ between the emitted light TL and the reception light RL may, for example, correspond to a time-of-flight (ToF). In one embodiment, the distance of the object OBJ from the ToF sensor 100 may be calculated by the following equation: R=c*ToF/2, where R represents the distance of the object OBJ and c represents the velocity of light. Further, the distance of the object OBJ from the ToF sensor 100 may also be calculated based on Equation 4 using the phase difference Φ between the emitted light TL and reception light RL.

$$R = \frac{c}{4\pi f}\phi \quad (4)$$

where f represents a modulation frequency, which, for example, may be the frequency of the intensity of the emitted light TL or the frequency of the intensity of the reception light RL.

In FIG. 3, the example is illustrated where the intensity of the transmission light TL has a waveform of a sine wave. In other embodiments, the intensity of the transmission light TL may have other types of waveforms. Further, the ToF sensor 100 may extract depth information according to the waveform of the intensity of the transmission light TL, a structure of a depth pixel, and/or another feature or parameter.

FIG. 4 illustrates an example embodiment of modulation timing and demodulation timings of a depth pixel having a multi-tap structure. In the case of a two-tap structure, first and second demodulation signals DEM1 and DEM2 may be differentiated from third and fourth demodulation signals DEM3 and DEM4, for example, by a time-division scheme. In the case of a four-tap structure, the first through fourth demodulation signals DEM1 through DEM4 may be applied simultaneously to the same depth pixel. The duty ratio of the demodulation signals DEM1 through DEM4 of the four-tap structure may be reduced below half of the duty ratio in case of the two-tap structure. FIG. 4 describes an example of modulation timing corresponding to the phase of the transmission light TL and demodulation timing corresponding to the phases of the demodulation signals DEM1~DEM4. Operation of the ToF sensor may be modified in various ways in other embodiments.

Referring to FIG. 4, the transmission light TL from light source 210 may be output in synchronization with a signal from the controller 150. The first through fourth demodulation signals DEM1 through DEM4 may be generated in synchronization with the signal from the controller 150. The first through fourth demodulation signals DEM1 through DEM4 have phase differences of 0, 90, 180 and 270 degrees, respectively. As described above with reference to FIG. 3, four samples A0, A1, A2 and A3 of the reception light RL may be sampled at phases of 0 degree, 90 degrees, 180 degrees and 270 degrees per period, respectively. The sampling phases may be different in another embodiment.

In FIG. 4, an example is illustrated where the phase of the first demodulation signal DEM1 coincides with the phase of the transmission light TL. In one embodiment, the first through fourth demodulation signals DEM1 through DEM4 may be applied to first through fourth demodulation transfer gates, respectively, as described below.

While FIGS. 3 and 4 are provided for describing an example of the principal of measuring and calculating distance to an object using a ToF sensor, it is understood that one or more other example embodiments are not limited thereto. For example, the duty ratio of the transmission light TL and/or the number, phase differences and/or the duty ratio of the demodulation signals may be different from those corresponding to FIGS. 3 and 4 in other embodiments.

Figure 5:
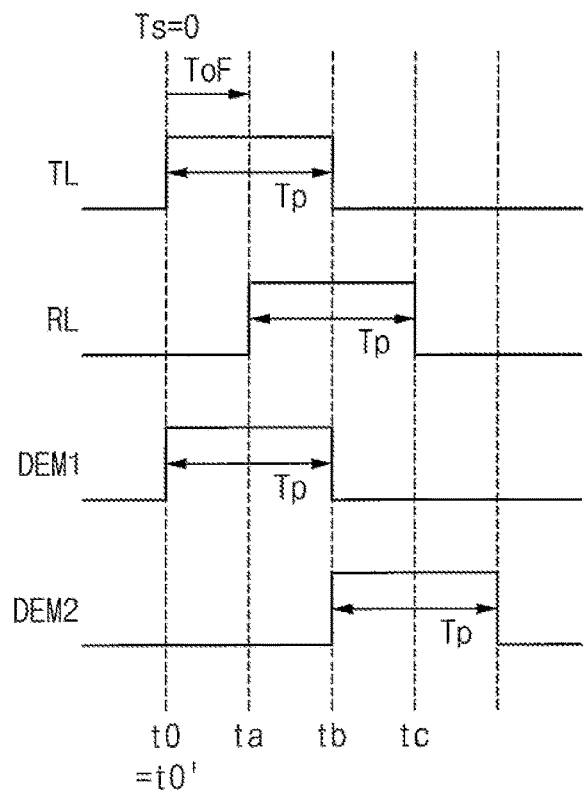
FIGS. 5 and 6 illustrate example embodiments of a time shift of a ToF sensor.
Figure 6:
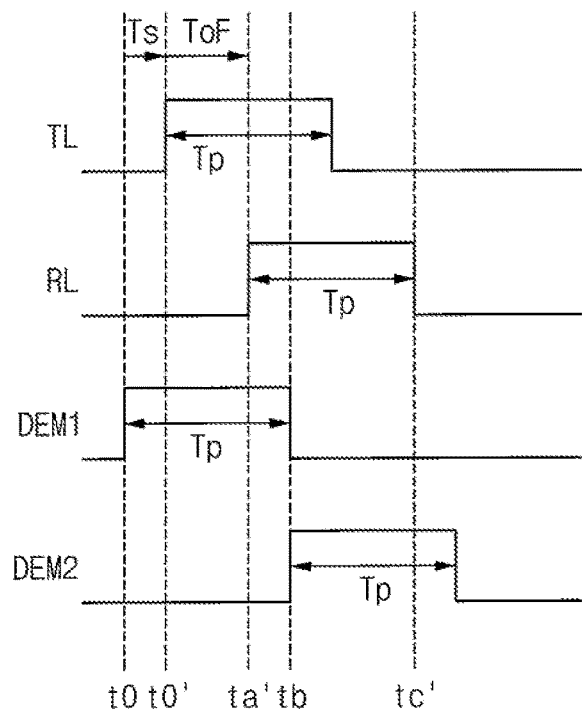

FIGS. 5 and 6 are diagrams illustrating a time shift of a ToF sensor according to example embodiments. In FIGS. 5 and 6, the following are illustrated in accordance with an example of a two-tap structure: timings of transmission light TL, reception light RL corresponding to an arbitrary time-of-flight ToF, first demodulation signal DEM1 corresponding to a first tap, and a second demodulation signal DEM2 corresponding to a second tap. Also, a case where time shift Ts is zero is illustrated in FIG. 5 and case where time shift Ts has a positive value is illustrated in FIG. 6.

When the depth pixel has the two-tap structure including the first tap and the second tap, the first tap may correspond to the first reference tap and the second tap may correspond to the second reference tap, regardless of the time-of-flight ToF (e.g., the distance between the ToF sensor and the object).

Referring to FIGS. 5 and 6, a pulse width of the transmission light TL and pulse widths of the plurality of demodulation signals may be equal to each other as a reference time Tp. The falling edge of the first demodulation signal DEM1 and the rising edge of the second demodulation signal DEM2 may be synchronized at time point tb, and the pulse of the reception light RL may be divided at the time point tb by the pulse of the first demodulation signal DEM1 and the second demodulation signal DEM2. In some example embodiments, the pulse width of the first demodulation signal DEM1 may be set to be different from the pulse width of the second demodulation signal DEM2.

When the time shift Ts is zero as illustrated in FIG. 5, time point t0' corresponding to the rising edge of the transmission light TL may coincide with time point t0 corresponding to the rising edge of the first demodulation signal DEM1. In contrast, when the time shift Ts has a positive value as illustrated in FIG. 6, time point t0' corresponding to the rising edge of the transmission light TL may lag behind time point t0 corresponding to the rising edge of the first demodulation signal DEM1. The time point t0' corresponding to the rising edge of the transmission light TL may precede time point t0 corresponding to the rising edge of the first demodulation signal DEM1 when the time shift Ts has a negative value.

A first sampling operation may be performed by setting the time shift Ts to be zero as illustrated in FIG. 5. In this case, the sampled data by the first demodulation signal DEM1 corresponds to (tb−ta) and the sampled data by the second demodulation signal DEM2 corresponds to (tc−tb). A second sampling operation may be performed by setting the time shift Ts to be a positive value as illustrated in FIG. 6. In this case, the sampled data by the first demodulation signal DEM1 corresponds to (tb−ta') and the sampled data by the second demodulation signal DEM2 corresponds to (tc'−tb). As such, based on a plurality of sampled data corresponding to a plurality of time shifts, the cross time shift may be determined, for example, as described with reference to FIGS. 7 and 8F.

In some example embodiments, the time shift Ts may be changed by changing the delay amount (or phase) of the transmission light TL and/or the delay amount of the demodulation signals DEM1 and DEM2. The light source 210 and/or the row scanning circuit 130 in FIG. 2 may include a delay circuit to adjust the phase of the transmission light TL and/or the demodulation signals DEM1 and DEM2 based on control signals from the controller 150. The time shift Ts may be increased by increasing the delay amount of the transmission light TL or by decreasing the delay amount of the demodulation signals DEM1 and DEM2. In other words, the time shift Ts may be decreased by decreasing the delay amount of the transmission light TL or by increasing the delay amount of the demodulation signals DEM1 and DEM2.

Figure 7:
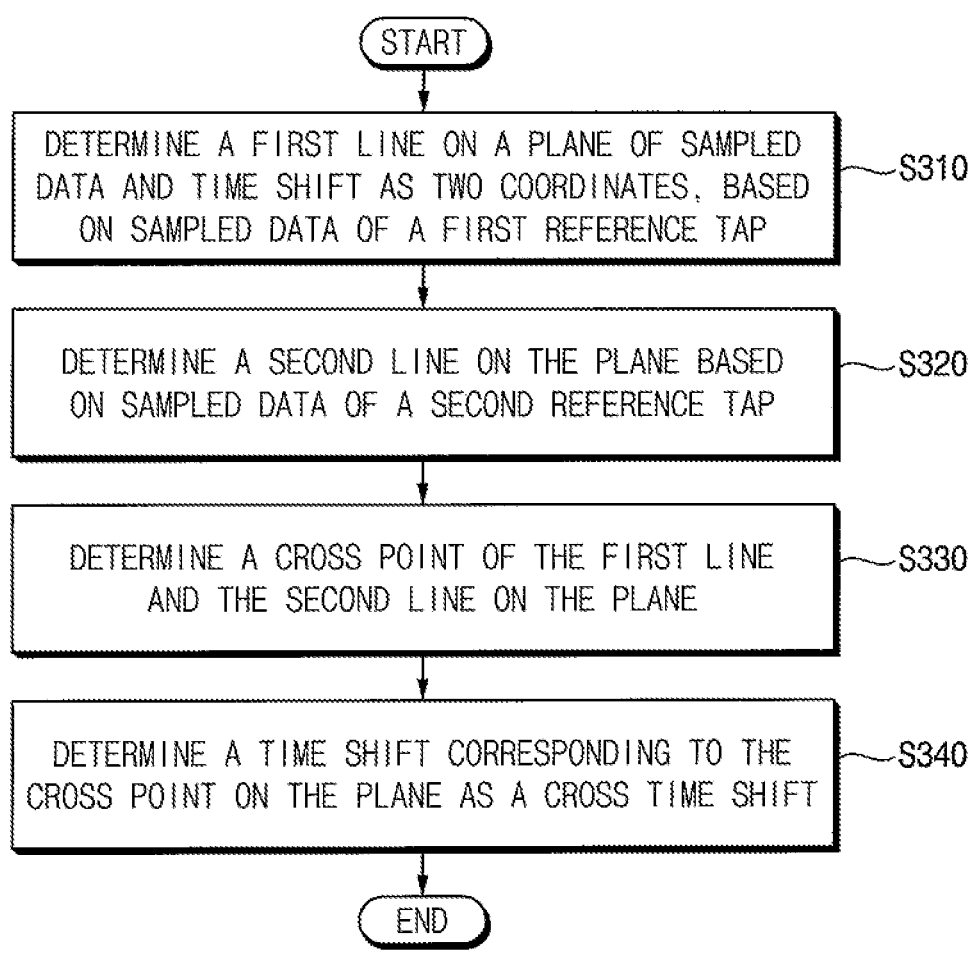
FIG. 7 illustrates an example embodiment of a method of determining a cross time shift to measure distance.

FIG. 7 is flow chart illustrating an example embodiment of a method of determining cross time shift which may be used in a method of measuring a distance according to example embodiments. FIGS. 8A through 8F are diagrams illustrating sampled data according to a time shift of a ToF sensor according to example embodiments.

Figure 8A:
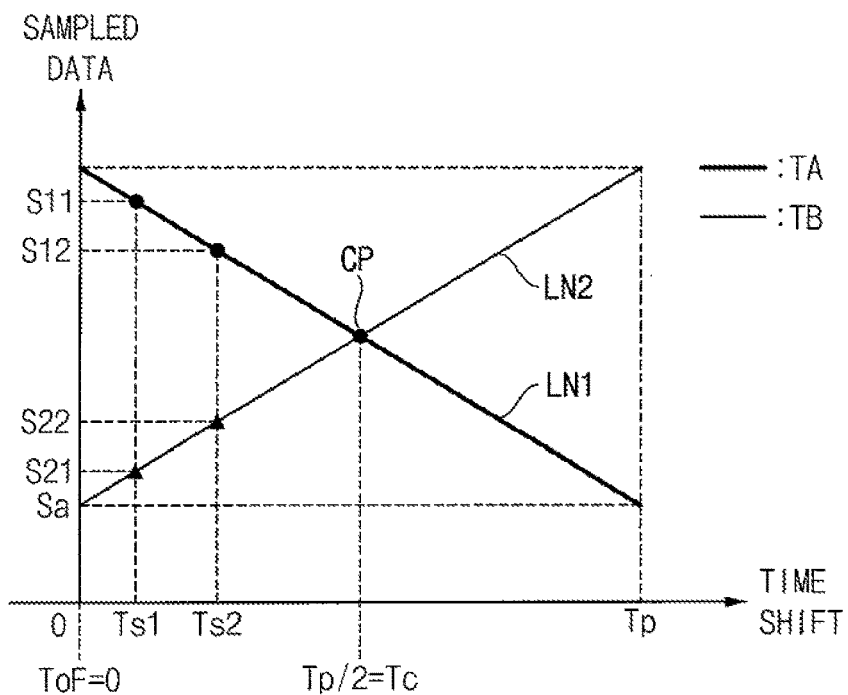
FIGS. 8A through 8F illustrate embodiments of sampled data according to a time shift of a ToF sensor.

Referring to FIGS. 7 and 8A, the method includes, at S310, a first line LN on a plane of sampled data and time shift as two coordinates may be determined based on the sampled data S11 and S12 of the first reference tap TA At S320, a second line LN2 on the plane may be determined based on the sampled data S21 and S22 of the second reference tap TB. The first line LN1 may be determined based on Equation 5 and the second line LN2 may be determined based on Equation 6.

$$S1(T)=m1*(T-Ts1)+S11 \text{ or } S1(T)=m1*(T-Ts2)+S12$$

$$m1=(S12-S11)/(Ts2-Ts1) \qquad (5)$$

$$S2(T)=m2*(T-Ts2)+S21 \text{ or } S2(T)=m2*(T-Ts2)+S22$$

$$m2=(S22-S21)/(Ts2-Ts1) \qquad (6)$$

In Equations 5 and 6, S1(T) indicates the sampled data of the first reference tap TA at a time shift T, S2(T) indicates the sampled data of the second reference tap TB at the time shift T, S11 indicates the sampled data of the first reference tap TA at the first time shift Ts1, S12 indicates the sampled data of the first reference tap TA at the second time shift Ts2, S21 indicates the sampled data of the second reference tap TB at the first time shift Ts1, and S22 indicates the sampled data of the second reference tap TB at the second time shift Ts2.

As illustrated in FIG. 8A, the slope m1 of the first line LN1 may be determined based on the two points (Ts1, S11) and (Ts2, S12) on the plane, and the slope m2 of the second line LN2 may be determined based on the two points (Ts1, S21) and (Ts2, S22) on the plane. In other words, the first line LN1 and the second line LN2 may be determined using the sampled data according to the two sampling operations corresponding to the two different time shifts Ts1 and Ts2. In some example embodiments, the first and second lines LN1 and LN2 on the plane may be determined based on the sampled data according to the three or more sampling operations corresponding to the three or more different time shifts. In this case, the equations of the first and second lines LN1 and LN2 may be determined, for example, by a fitting technique (e.g., least mean square method) based on the three or more points on the plane.

At S330, a cross point CP of the first line LN1 and the second line LN2 on the plane may be determined.

At S340, a time shift corresponding to the cross point CP on the plane may be determined as the cross time shift Tc. The cross time shift Tc may be determined based on Equation 7, for example, by applying the condition of S1(Tc)=S2(Tc) to Equations 5 and 6.

$$(m1-m2)*Tc=m1*Ts1-m2*Ts2+S21-S11 \qquad (7)$$

Figure 8B:
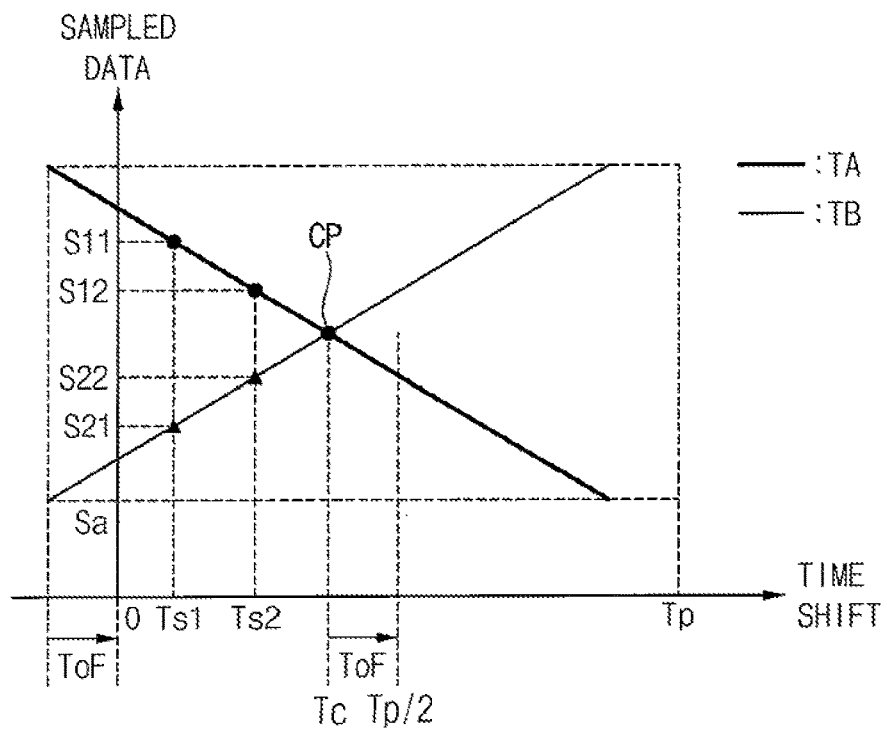
Figure 8C:
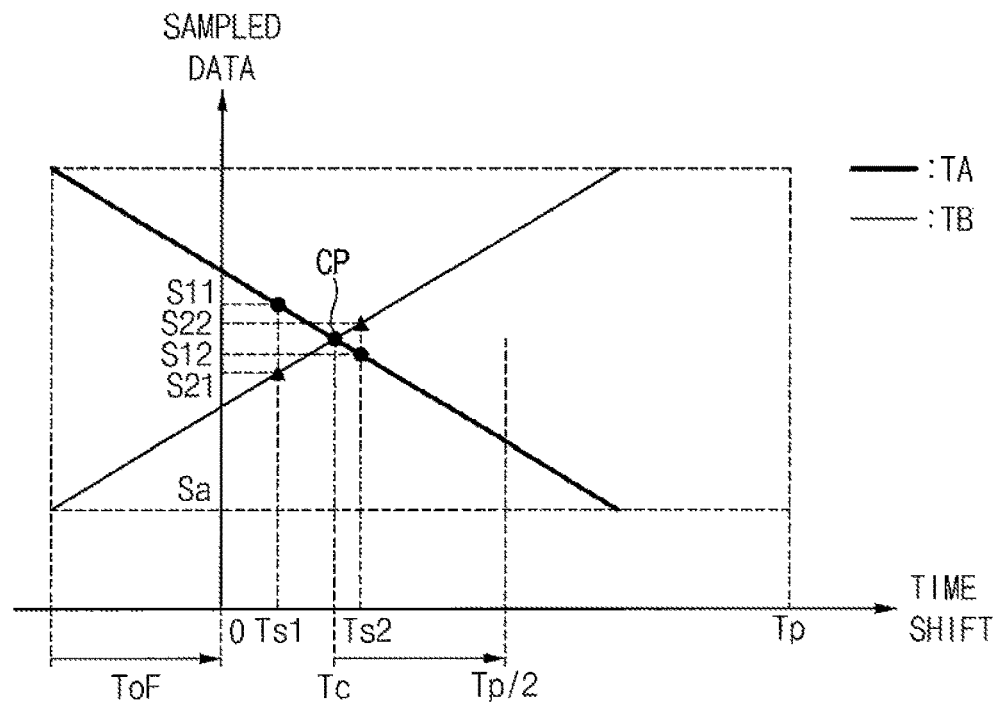
Figure 8D:
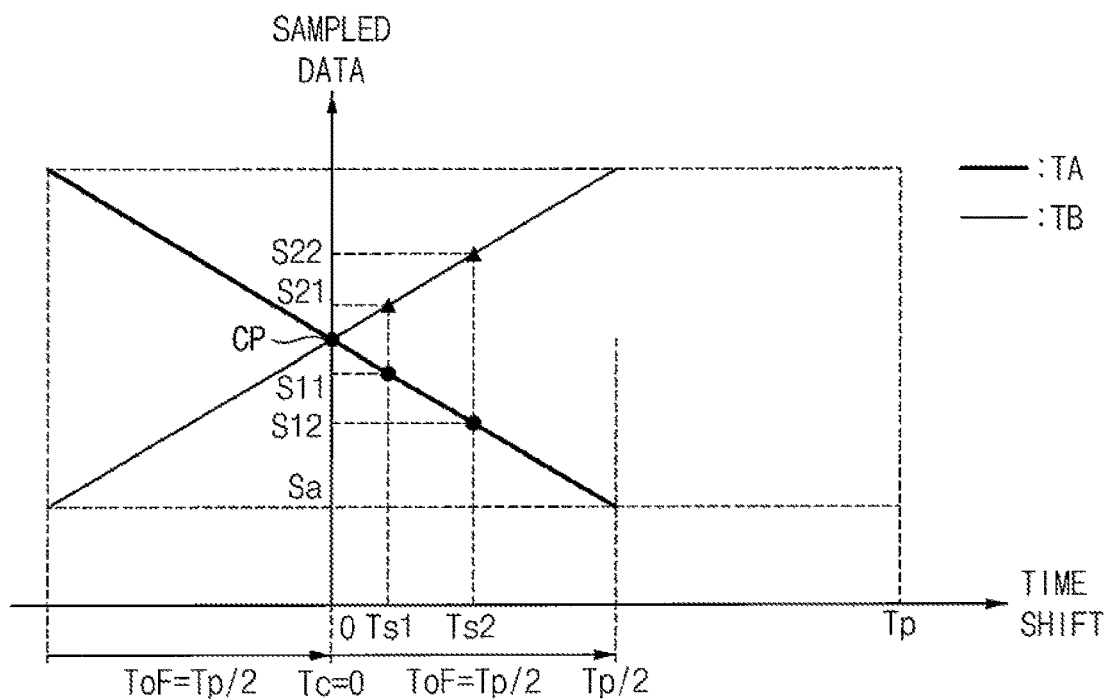
Figure 8E:
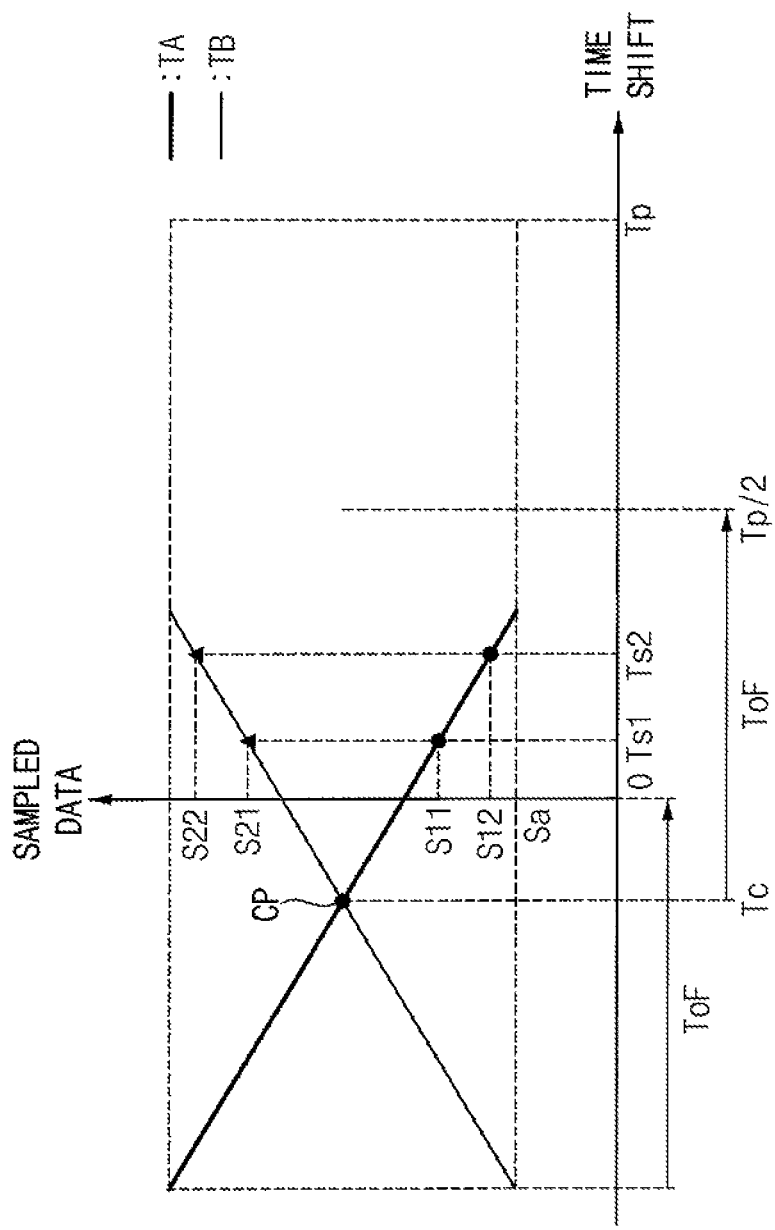
Figure 8F:
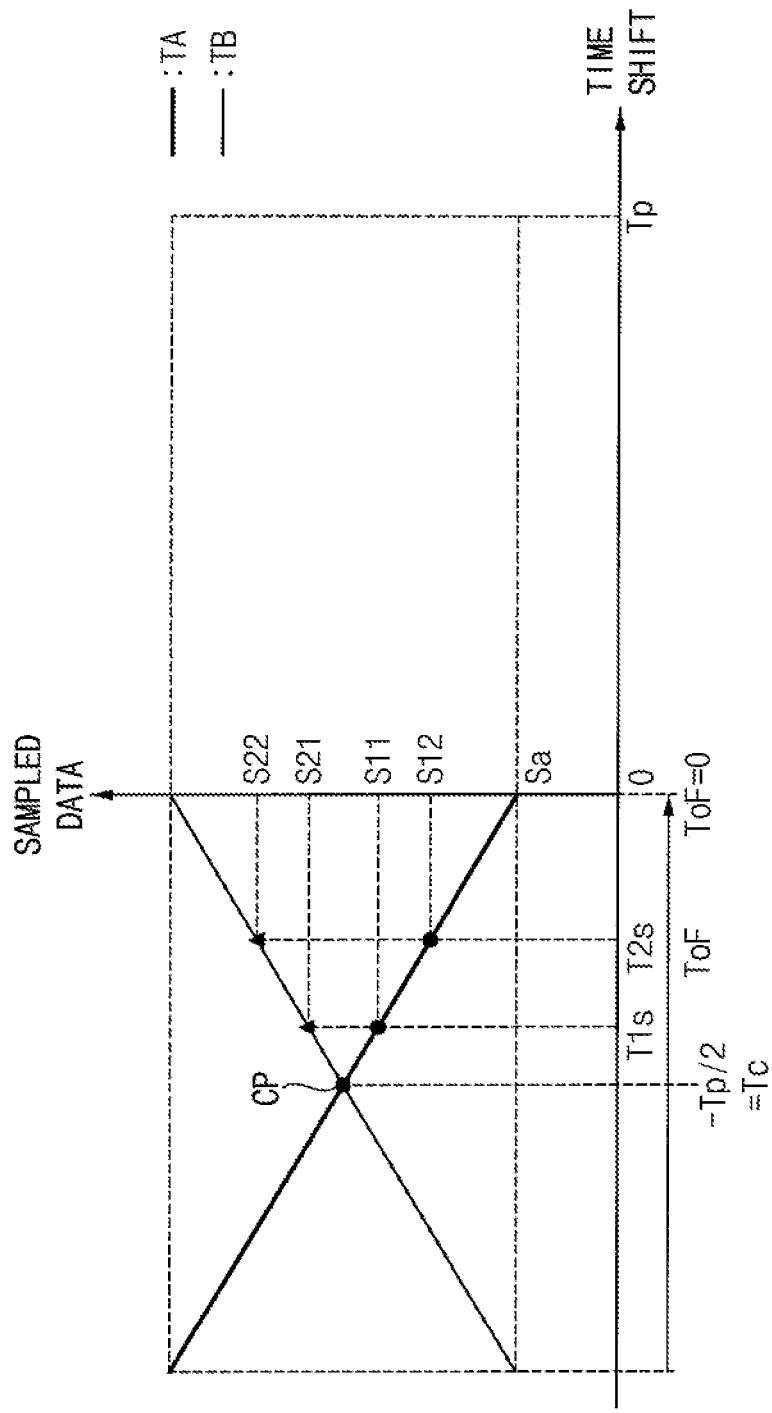

FIGS. 8A through 8F illustrate example embodiments of values of the time-of-flight (ToF). FIG. 8A illustrates a case where ToF is zero. FIGS. 8B and 8C illustrate cases where ToF is between zero and Tp/2. FIG. 8D illustrates a case where ToF is Tp/2. FIG. 8E illustrates a case where ToF is between Tp/2 and Tp. FIG. 8F illustrates a case where ToF is Tp. Depending on the ToF, the cross time shift Tc may be a positive value (e.g., as in FIGS. 8A, 8B and 8C), zero (e.g., as in FIG. 8D), or a negative value (e.g., as in FIGS. 8E and 8F). In one example embodiment, the time shifts Ts1 and Ts2 may be set to be negative values as illustrated in FIG. 8F.

The ToF may be determined using the reference time Tp and the cross time shift Tc, and the distance between the ToF sensor and the object may be determined based on the ToF represented based on Equation 8.

$$ToF=2*D/c=Tp/2-Tc \qquad (8)$$

where D indicates the distance and c indicates the velocity of light.

Also, in FIGS. 8A through 8F, Sa indicates reference sampled data depending on the ambient light and the characteristic deviation of the depth pixel. Even though the reference sampled data Sa is equal with respect to the first reference tap TA and the second reference tap TB in FIGS. 8A through 8B, the reference sampled data may be different depending on the tap due to the offsets or gain deviations of the depth pixels, and the difference of the reference sampled data may affect the calculated distance.

In some example embodiments, the reference time Tp in Equation 8 may be replaced with compensation values (e.g., corresponding to respective depth pixels through calibration process) to compensate for characteristic deviations of one or more of the depth pixels. The summed values S11+S12 and S12+S22 of the tap signals may be substantially constant and the offset deviations of the taps may not affect the slopes m1 and m2 of the first and second lines LN1 and LN2 and the variation of the time shifts.

In some example embodiments, the first time shift Ts1 corresponding to the first sampling operation and the second time shift Ts2 corresponding to the second sampling operation may be fixed as proper values. In some example embodiments, the second time shift Ts2 of the first sampling operation may be varied depending on the result of the first sampling operation. In some example embodiments, the difference between the two time shifts Ts1 and Ts2 may be set to be less than Tp/2.

Figure 9:
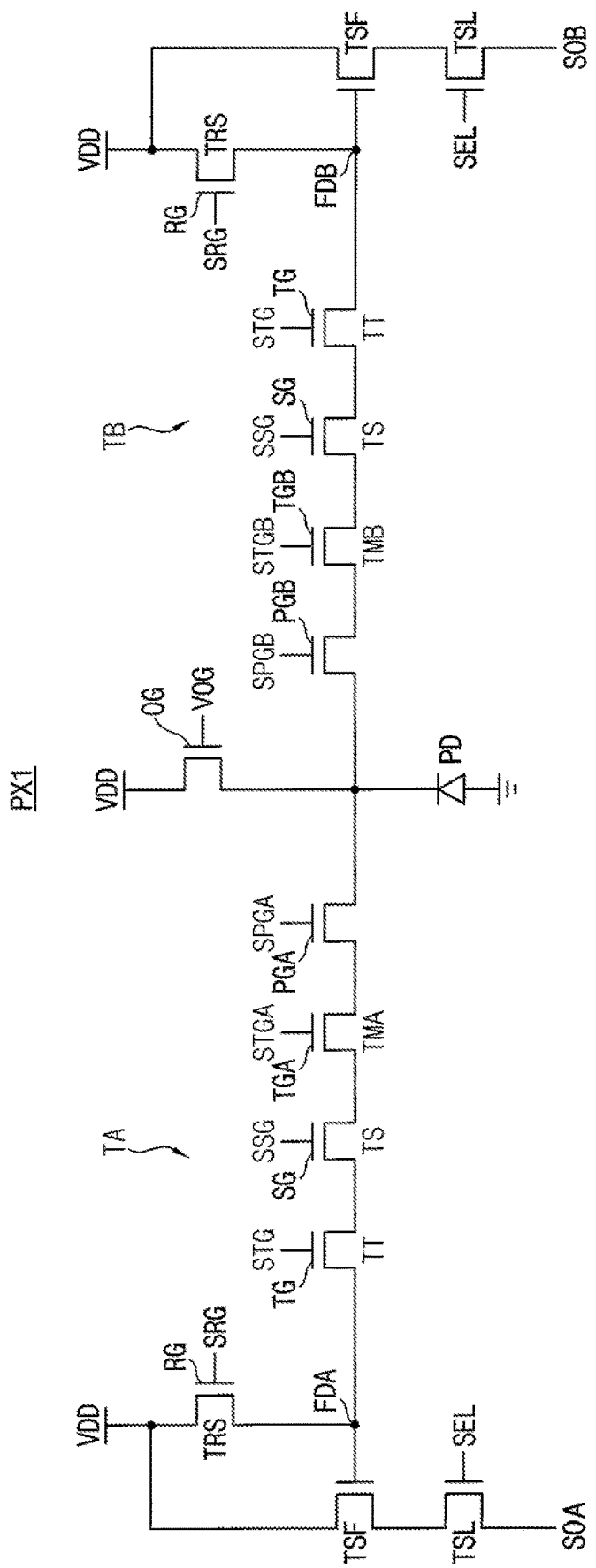
FIG. 9 illustrates an embodiment of a depth pixel having a two-tap structure in a ToF sensor.
Figure 10:
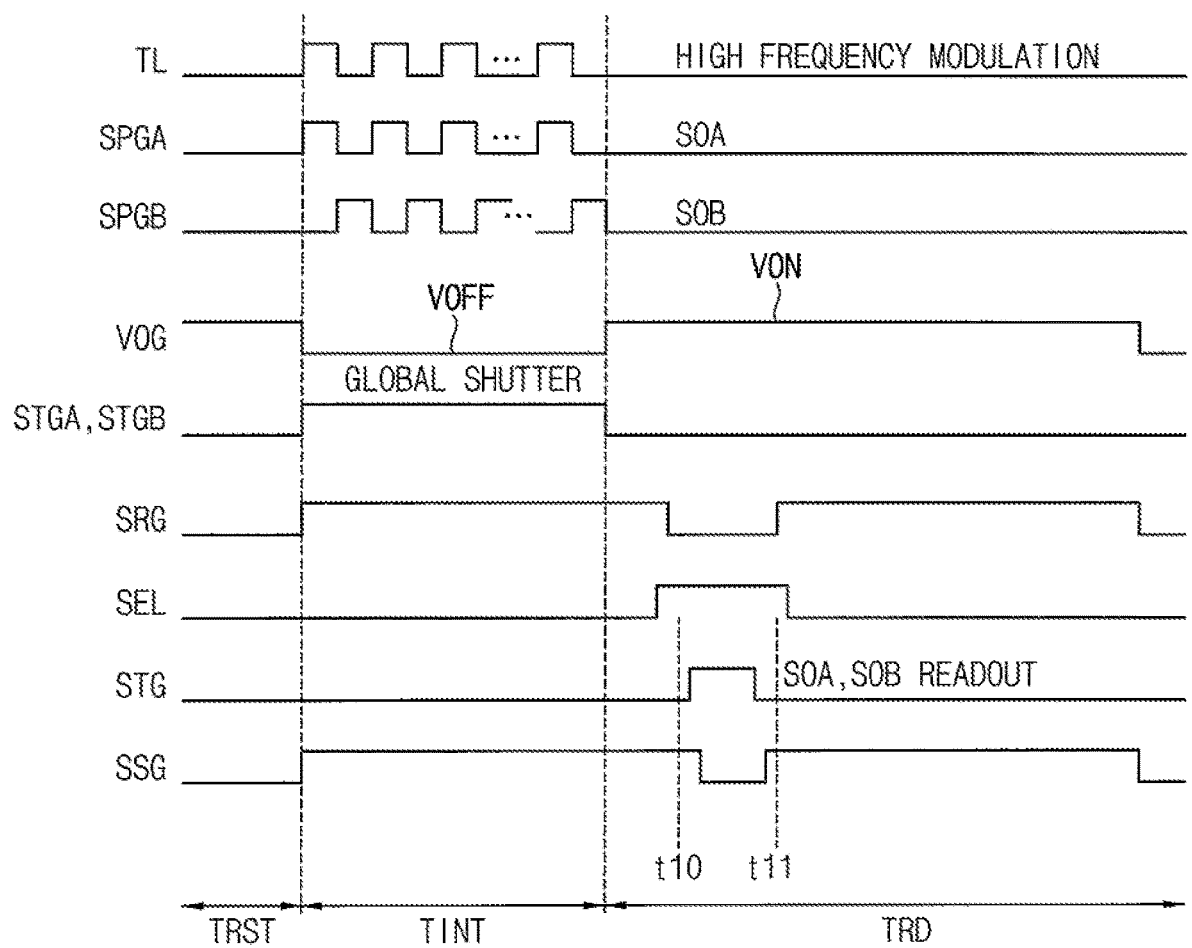
FIG. 10 illustrates an example operation of a ToF sensor including a depth pixel.

FIG. 9 is a circuit embodiment of a depth pixel having a two-tap structure in a ToF sensor. FIG. 10 is a timing diagram illustrating an example embodiment of an operation of a ToF sensor including the depth pixel of FIG. 9. FIG. 9 illustrates a two-tap structure in which an individual photogate is applied per tap.

Referring to FIG. 9, a depth pixel PX1 may include a first photogate PGA and transistors TMA, TS and TT corresponding to the first tap TA and a second photogate PGB and transistors TMB, TS and TT corresponding to the second tap TB, transistors TRS, TSF and TSL corresponding to readout circuits, an overflow gate OG and a photodiode PD. Each of the transistors TMA, TMB, TS, TT and TRS may include a gate disposed above a semiconductor substrate and source and drain regions at respective sides of the gate in the semiconductor substrate. The gates of the transistors TMA, TMB, TS, TT and TRS correspond to a first demodulation transfer gate TGA, a second demodulation transfer gate TGB, storage gates SG, and floating diffusion (FD) transfer gates TG and reset gates RG, respectively.

A first photogate signal SPGA is applied to the first photogate PGA, a second photogate signal SPGB is applied to the second photogate PGB, a first demodulation control signal STGA is applied to the first demodulation transfer gate TGA, a second demodulation control signal STGB is applied to the second demodulation transfer gate TGB, an overflow gate voltage VOG is applied to the overflow gate OG, a storage control signal SSG is applied to the storage gates SG, an FD transfer control signal STG is applied to the FD transfer gates TGA and TGB, a reset signal SRG is applied to the reset gates RG, and a selection signal SEL is applied to the gates of the selection transistors TSL. The first photogate signal SPGA and the second photogate signal SPGB correspond to the above-described demodulation signals having different phases.

The demodulation signals SPGA and SPGB, the demodulation transfer control signals STGA and STGB, the overflow gate voltage VOG, the storage control signal SSG, the FD transfer control signal STG, the reset signal SRG, and the selection signal SEL may be provided from the row scanning circuit 130 under control of a controller 150, for example, as described with reference to FIG. 2.

The storage gates SG are one of charge storing structures that temporarily store the photo charge transferred from the photodiode PD through the demodulation transfer gates TGA and TGB before transferring the photo charge to the floating diffusion regions FDA and FDB. In some example embodiments, the charge storing structure may be implemented with the storage gate SG alone. In some example embodiments, the charge storing structure may be implemented with the storage gate SG and a storage diode formed in the semiconductor substrate under the storage gate SG. Using such a charge storing structure, true correlated double sampling (CDS) may be performed and noise in the readout signals may be reduced. In one example embodiment, the FD transfer gates TG and/or the storage gates SG may be omitted.

The charge stored in the floating diffusion regions FDA and FDB may be provided as output signal, e.g., the sampled data SOA and SOB using the source follower transistors TSF and the selection transistors TSL.

Referring to FIGS. 2, 9 and 10, the light source 210 may generate transmission light TL modulated by a modulation frequency during an integration period TINT to collect a photo charge generated by an incident light. The row scanning circuit 130 may apply the first and second photogate signals (e.g., the first and second demodulation signals SPGA and SPGB having the different phases) to the first and second photogates PGA and PGB corresponding to the first and second taps TA and TB.

The overflow voltage VOG applied to the overflow gates OG may have a turn-off voltage level VOFF to block the photo charge from being drained from the photodiode PD during the integration period TINT. The demodulation transfer control signals STGA and STGB and the storage control signal SSG are activated during the integration period TINT. Accordingly, the photo charge collected by the first and second demodulation signals SPGA and SPGB may be stored in the semiconductor substrate under the storage gates SG, respectively.

During the other periods, for example, a reset period TRST to initialize the depth pixel PX and a readout period TRD to measure an amount of the photo charge collected during the integration period TINT, the overflow gate voltage VOG may have a turn-on voltage level VON to drain the photo charge from the photodiode PD. The collected photo charge may be drained to the terminal of the power supply voltage VDD during the periods TRST and TRD other than the integration period TINT. As such, a global shutter function may be implemented using the overflow gate OG.

At a first time point t10 during the readout period TRD when the reset signal SRG is deactivated and the selection signal SEL is activated, first and second reset state data of the first and second taps TA and TB may be output through the column lines, respectively. At a second time point t11 during the readout period TRD when the FD transfer control signal STG is activated and the storage control signal SSG1 is deactivated, the photo charge stored by the storage gates SG may be transferred to the floating diffusion regions FDA and FDB and the first and second sampled data SOA and SOB of the first and second taps TA and TB may be output through the column lines, respectively.

Figure 11:
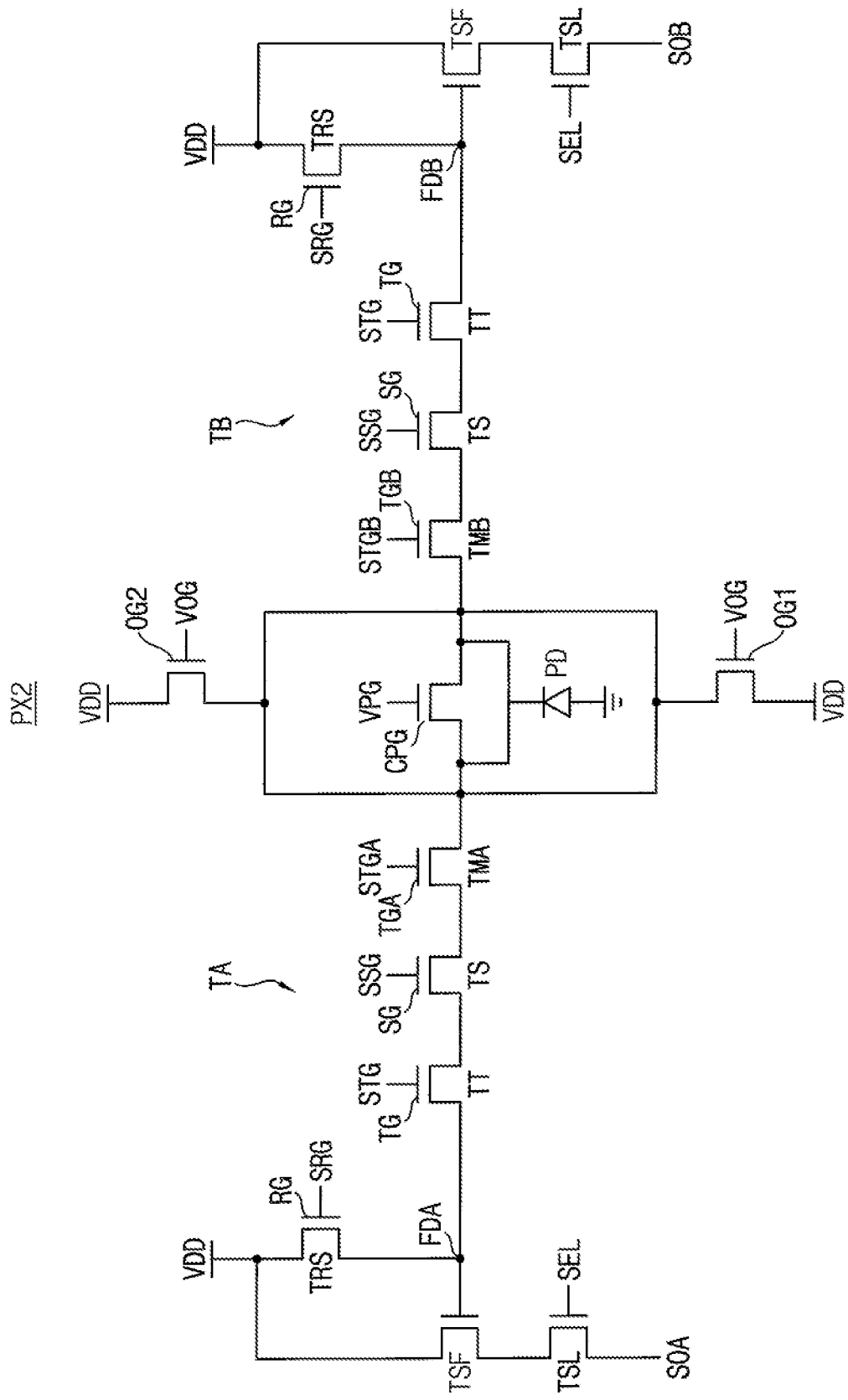
FIG. 11 illustrates an embodiment of a depth pixel having a two-tap structure in a ToF sensor.
Figure 12:
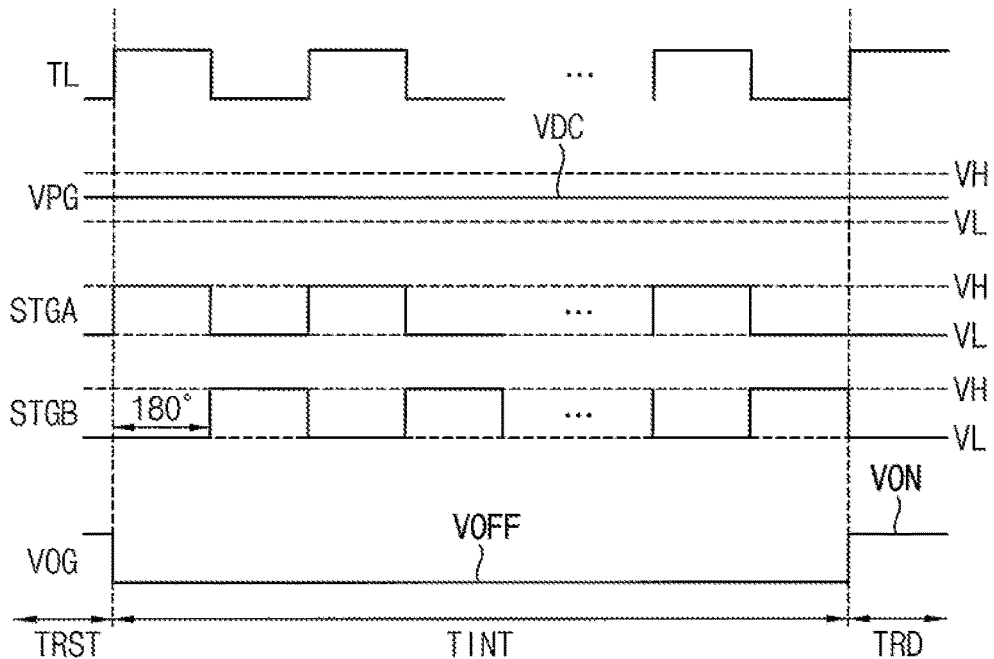
FIG. 12 illustrates an example operation of a ToF sensor including a depth pixel.

FIG. 11 is a circuit embodiment of a depth pixel having a two-tap structure in a ToF sensor. FIG. 12 is a timing diagram illustrating an example embodiment of an operation of a ToF sensor including the depth pixel of FIG. 10. The depth pixel PX2 of FIG. 11 may be, for example, similar to the depth pixel PX1 of FIG. 9.

Referring to FIG. 11, the depth pixel PX2 includes a common photogate CPG instead of the first and second photogates PGA and PGB of the depth pixel PX1 of FIG. 9. In case of the depth pixel PX2 of FIG. 11, the first demodulation transfer control signal STGA and the second demodulation transfer control signal STGB correspond to the above-described demodulation signals.

Referring to FIGS. 11 and 12, during the integration period TINT, a photogate voltage VPG applied to the common photogate CPG may have a DC voltage level VDC that causes collecting of the photo charge, and the overflow gate voltage VOG applied to the overflow gates OG1 and OG2 may have a turn-off voltage level VOFF that causes draining of the photo charge to be blocked. The DC voltage level VDC may be a voltage level between a high voltage level VH of the demodulation signals STGA and STGB and a low voltage level VL of the demodulation signals STGA and STGB.

In addition, during the integration period TINT, the first and second demodulation signals STGA and STGB of different phases may be applied to the first and second demodulation transfer gates TGA and TGB, respectively. The phase of the first demodulation signal STGA may be synchronized with the phase of the transmission light TL. In some example embodiments, the phase difference between the first and second demodulation signals STGA and STGB may be about 180 degrees.

Figure 13:
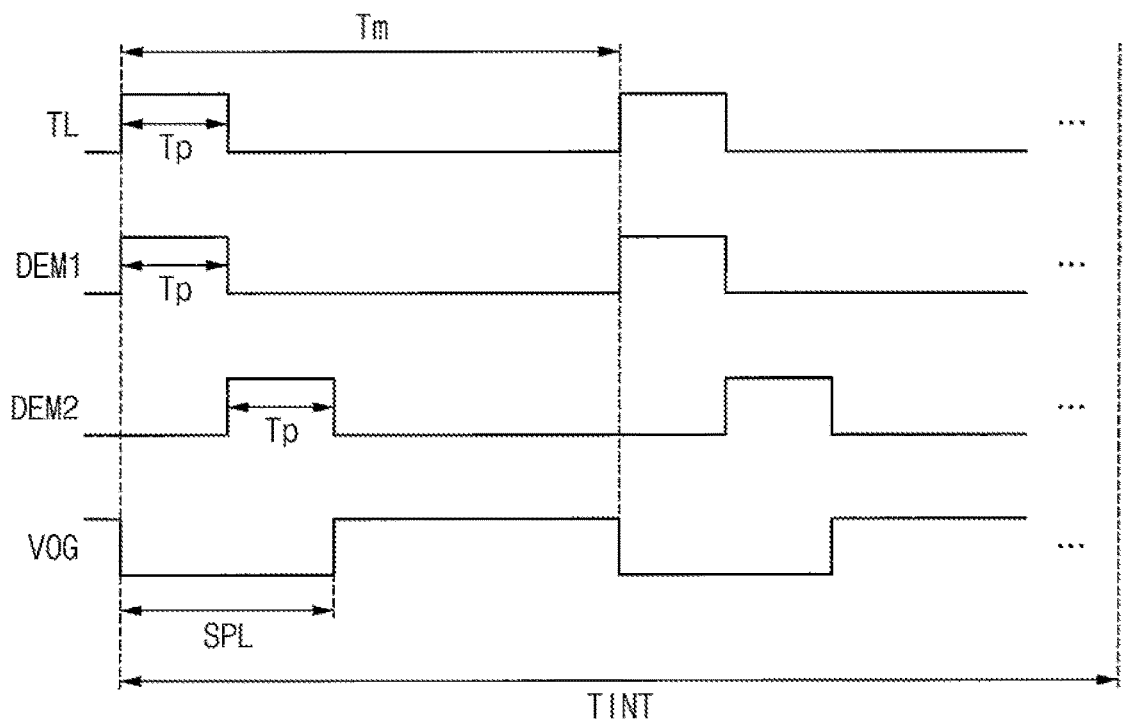
FIG. 13 illustrates an embodiment based on a pulse scheme of ToF.
Figure 14:
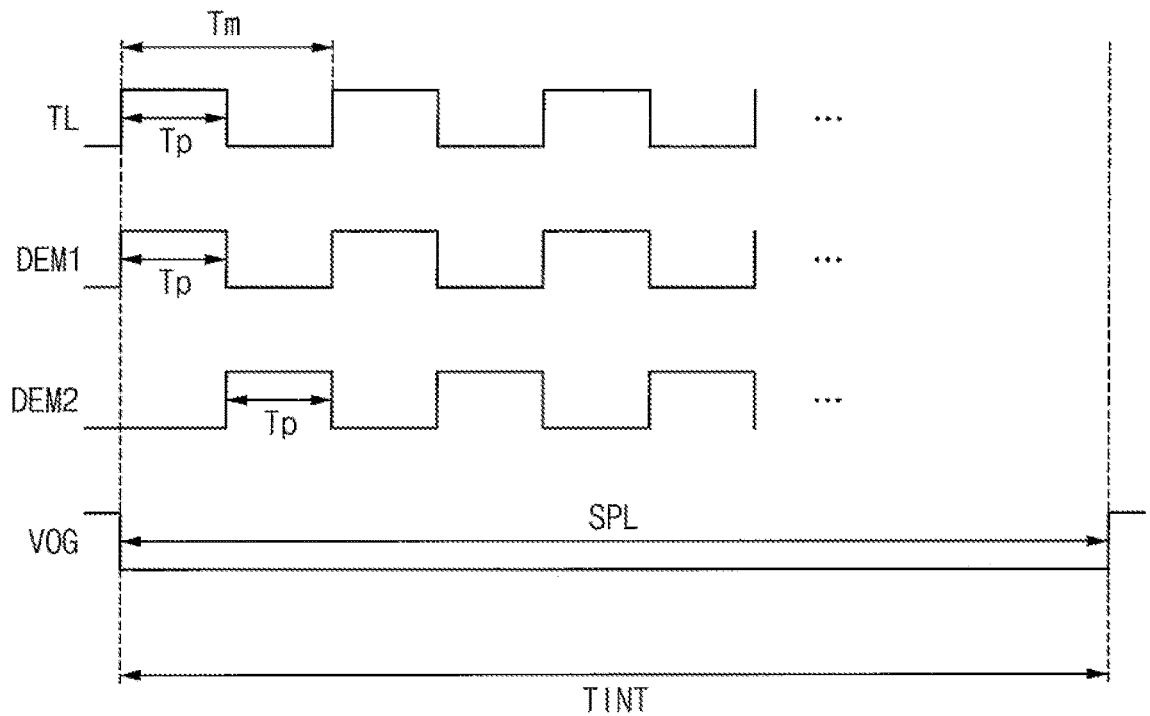
FIG. 14 illustrates an embodiment based on a continuous wave scheme of a ToF.

FIG. 13 is a timing diagram illustrating an embodiment of implementing an operation based on a pulse scheme of a ToF sensor. FIG. 14 is a timing diagram illustrating an embodiment of an operation based on a continuous wave scheme of a ToF sensor.

Referring to FIG. 13, the light source 210 in FIG. 2 may generate, as transmission light TL, a pulsed wave having a duty ratio lower than 0.5. In this case, the maximum value of the time-of-flight (ToF) measurable by the ToF sensor may be limited to a cyclic period Tm of the pulses in the transmission light TL. In other words, the ToF sensor may measure the distance between zero and $c/(2*fm)$, where c is the velocity of light and fm is the modulation frequency of the transmission light TL satisfying the equation: $fm=1/Tm$.

In such pulsed scheme of FIG. 13, a search may be performed to determine a basic time shift for placing a pulse of the reception light RL in a sampling range SPL, such that the reception light RL may be sampled by the demodulation signals DEM1 and DEM2. Examples are described with reference to FIGS. 15 and 16.

Referring to FIG. 14, the light source 210 in FIG. 2 may generate, as the transmission light TL, a continuous wave having a duty ratio of 0.5. In this case, the maximum value of the ToF measurable by the ToF sensor may be limited to a cyclic period Tm of the transmission light TL. Here, the cyclic period Tm may satisfy the equation: $Tm=2*Tp$. In other words, the ToF sensor may measure the distance between zero and $c*Tp$, where c is the velocity of light and Tp is the reference time corresponding to the pulse width of the transmission light TL.

Figure 15:
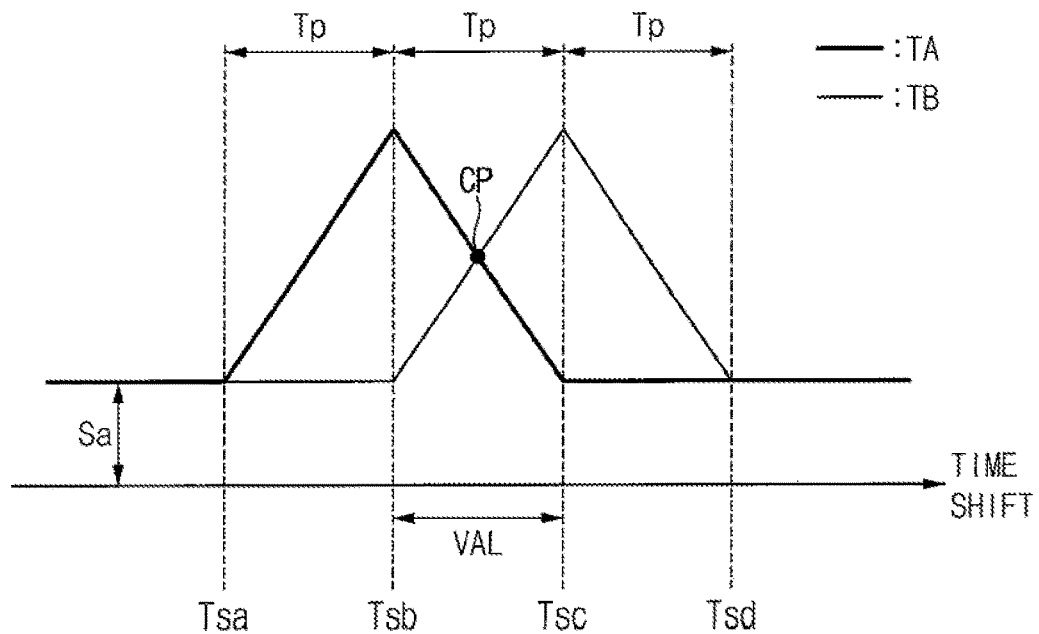
FIGS. 15 and 16 illustrate embodiments of a scanning method of a basic time shift of a ToF sensor.
Figure 16:
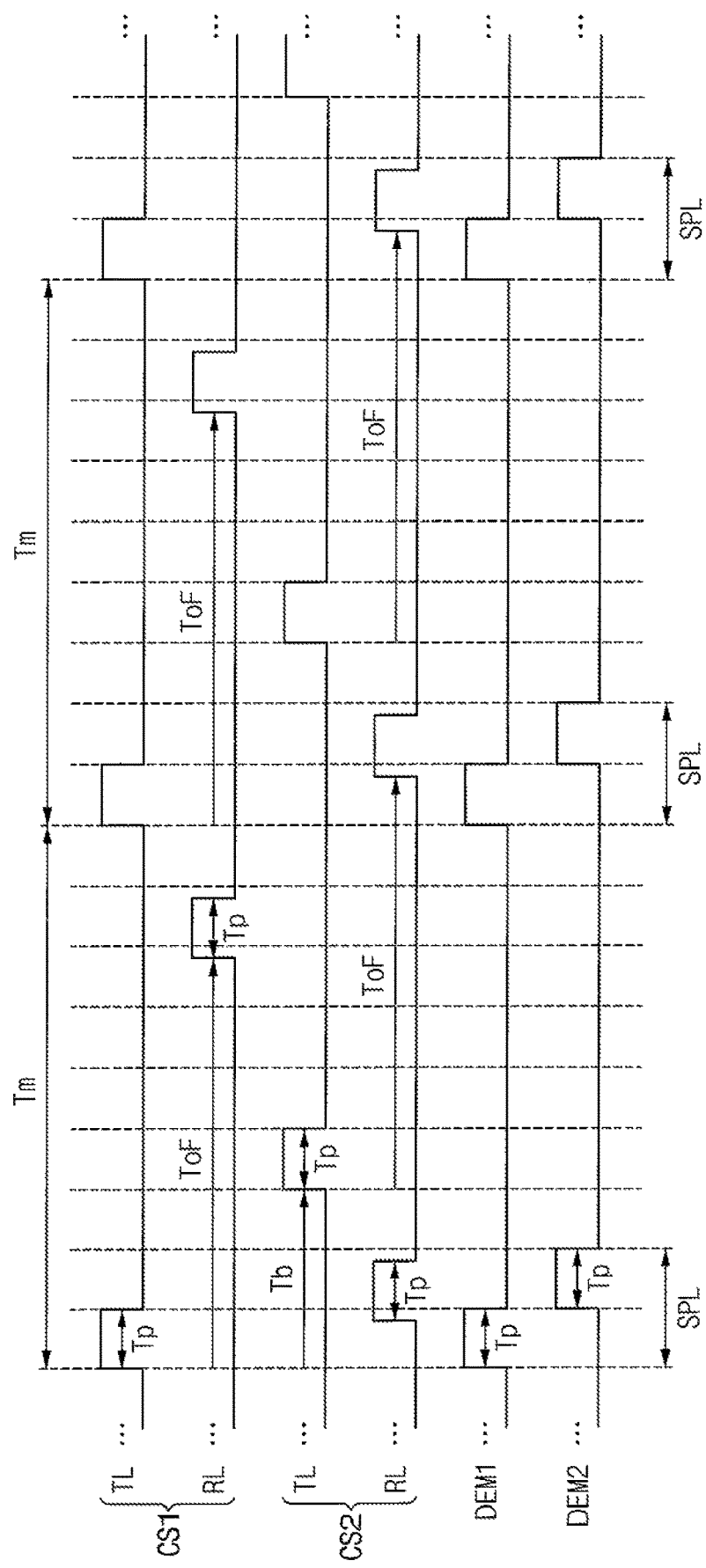

FIGS. 15 and 16 are diagrams illustrating embodiments of a scanning method of a basic time shift of a ToF sensor. In FIG. 15, a first sampled data is illustrated corresponding to a first tap TA and second sampled data is illustrated corresponding to a second tap TB, which may be sampled according to a time shift. In a region where the time shift is less than Tsa, the first sampled data and the second sampled data maintain a value corresponding to reference sampled data Sa. In a region where the time shift is between Tsa and Tsb, the first sampled data increase and the second sampled data maintain the value corresponding to the reference sampled data Sa. In a region where the time shift is between Tsb and Tsc, the first sampled data decrease and the second sampled data increase. In a region where the time shift is between Tsc and Tsd, the first sampled data maintain the value corresponding to the reference sampled data Sa and the second sampled data decrease. In a region where the time shift is greater than Tsd, the first sampled data and the second sampled data maintain the value corresponding to reference sampled data Sa.

As a result, the region of the time shift between Tsb and Tsc corresponds to a valid region VAL in which a cross point CP may exist. As such, a basic time shift may be searched for to place a pulse of the reception light RL in a sampling range SPL, so that the reception light RL may be sampled by the demodulation signals DEM1 and DEM2.

FIG. 16 illustrates example cases where the cyclic period Tm of the transmission light TL is 9Tp and the time-of-flight (ToF) is between 6Tp and 7Tp. A first case CS1 corresponds to the basic time shift of zero and a second case CS2 corresponds to the basic time shift of Tb. The first case CS1 corresponds to the region where the time shift is less than Tsa in FIG. 15, such that the pulse of the reception light RL is not included in the sampling range SPL. In contrast, the second case CS2 corresponds to the valid region VAL (e.g., a region where the time shift is between Tsb and Tsc in FIG. 15), such that the pulse of the reception light RL is included in the sampling range SPL.

In some example embodiments, to search for the basic time shift Tb, the sampling operations may be performed repeatedly by changing the time shift between the transmission light TL and the demodulation signals DEM1 and DEM2 by Tp or Tp/2, until the valid region VAL is found. As such, the basic time shift Tb between the transmission light TL and the demodulation signals DEM1 and DEM2 may be searched for and determined.

After the basic time shift Tb is determined, a cross time shift may be determined as described above, by performing a first sampling operation corresponding to a first time shift Tb+Ts1 and a second sampling operation corresponding to a second time shift Tb+Ts2. To include the cases to which the basic time shift Tb is applied, Equation 8 may be generalized to Equation 9 as follows.

$$ToF=2D/c=Tb+(Tp/2-Tc) \qquad (9)$$

Figure 17:
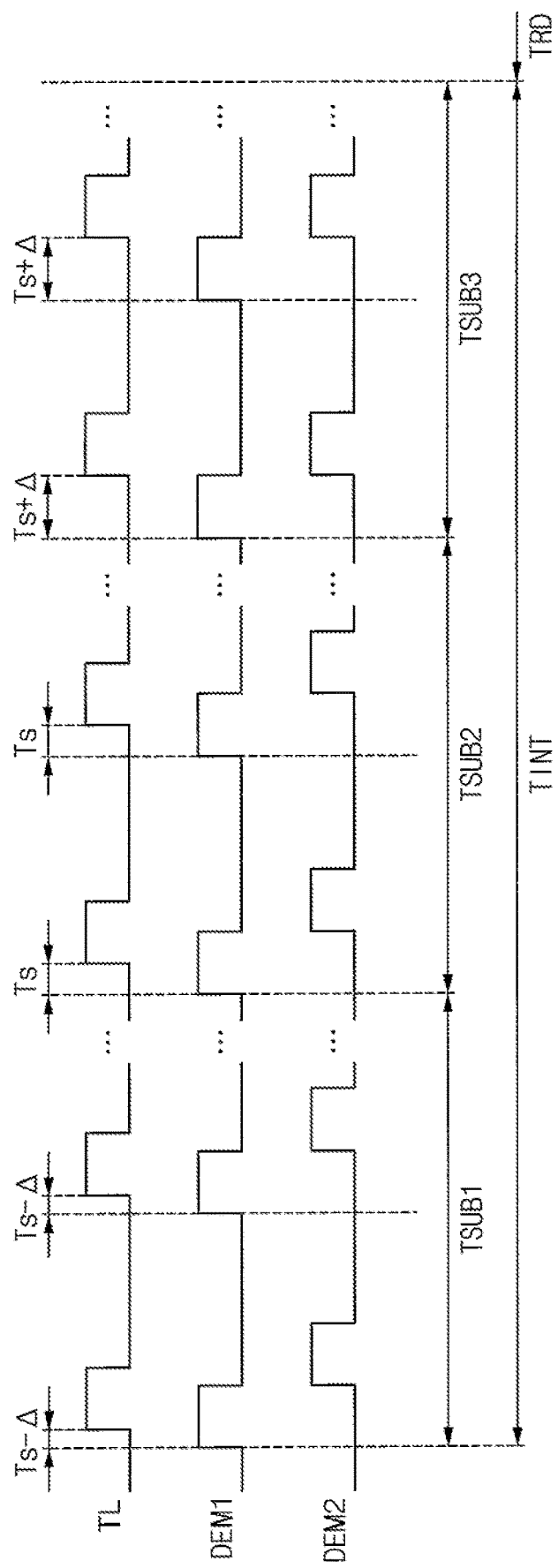
FIGS. 17 and 18 illustrates an example embodiment of a sampling operation of a ToF sensor.
Figure 18:
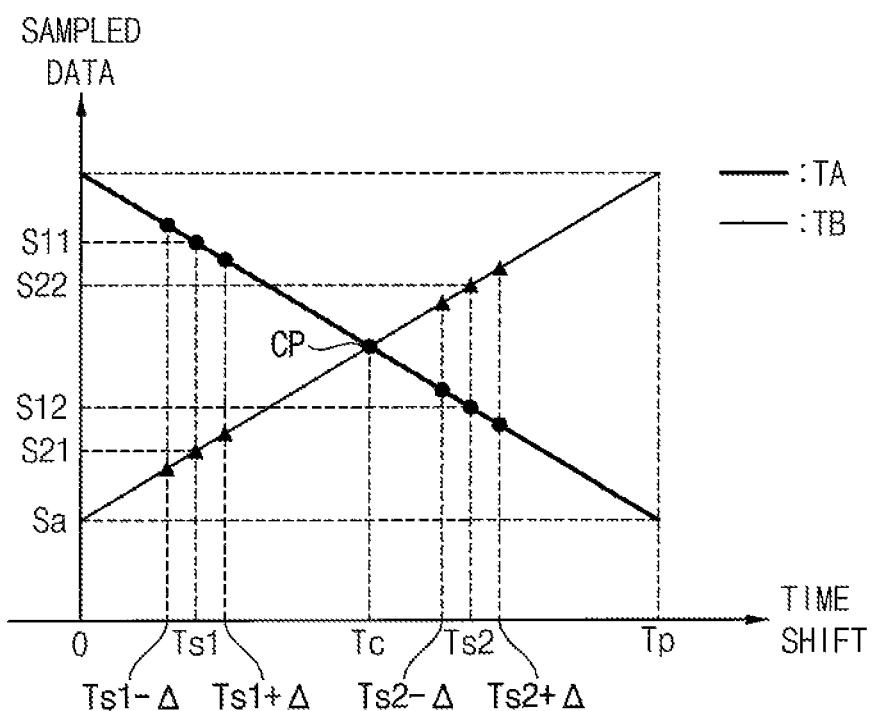

FIGS. 17 and 18 are diagrams illustrating example embodiments of a sampling operation of a ToF sensor. Referring to FIGS. 17 and 18, the time shift between the demodulation signals DEM1 and DEM2 may be changed during a single integration period TINT, to collect a photo charge generated by an incident light.

In some example embodiments, the integration period TINT may be divided into a plurality of sub periods and different time shifts may be applied to the sub periods. For example, as illustrated in FIG. 17, the integration period TINT may be divided into first through third sub periods TSUB1~TSUB3. The time shift Ts−Δ may be applied in the first sub period TSUB1, the time shift Ts may be applied in the second sub period TSUB2, and the time shift Ts+Δ may be applied in the third sub period TSUB3. After the integration period TINT, the sampled data may be read out as described above.

FIG. 18 illustrates an example of the sampled data according to time shift obtained by applying the method of FIG. 17. As illustrated in FIG. 18, the cross time shift Tc corresponding to the cross point CP may be determined based on sampled data S1*l* and S12 obtained by the first sampling operation with the plurality of time shifts Ts1−Δ, Ts1 and Ts1+Δ and based on the sampled data S21 and S22 obtained by the second sampling operation with the plurality of time shifts Ts1−Δ, Ts1 and Ts1+Δ.

In some cases, there may exist a deviation in the sampled data per sampling operation, and thus accuracy of the cross time shift Tc may be increased as the number of sampling is increased. However, operation speed of the ToF sensor is reduced as the number of sampling is increased. As described with reference to the embodiments of FIGS. 17 and 18, the time shift may be changed in a single integration period TINT and averaged sampled data of the plurality of time shifts may be read out by a single read operation. Accordingly, accuracy of distance measurement may be enhanced by cancelling one or more characteristic deviations such as fixed pattern noise, wiggling noise, etc., without reducing the operation speed of the ToF sensor.

Figure 19:
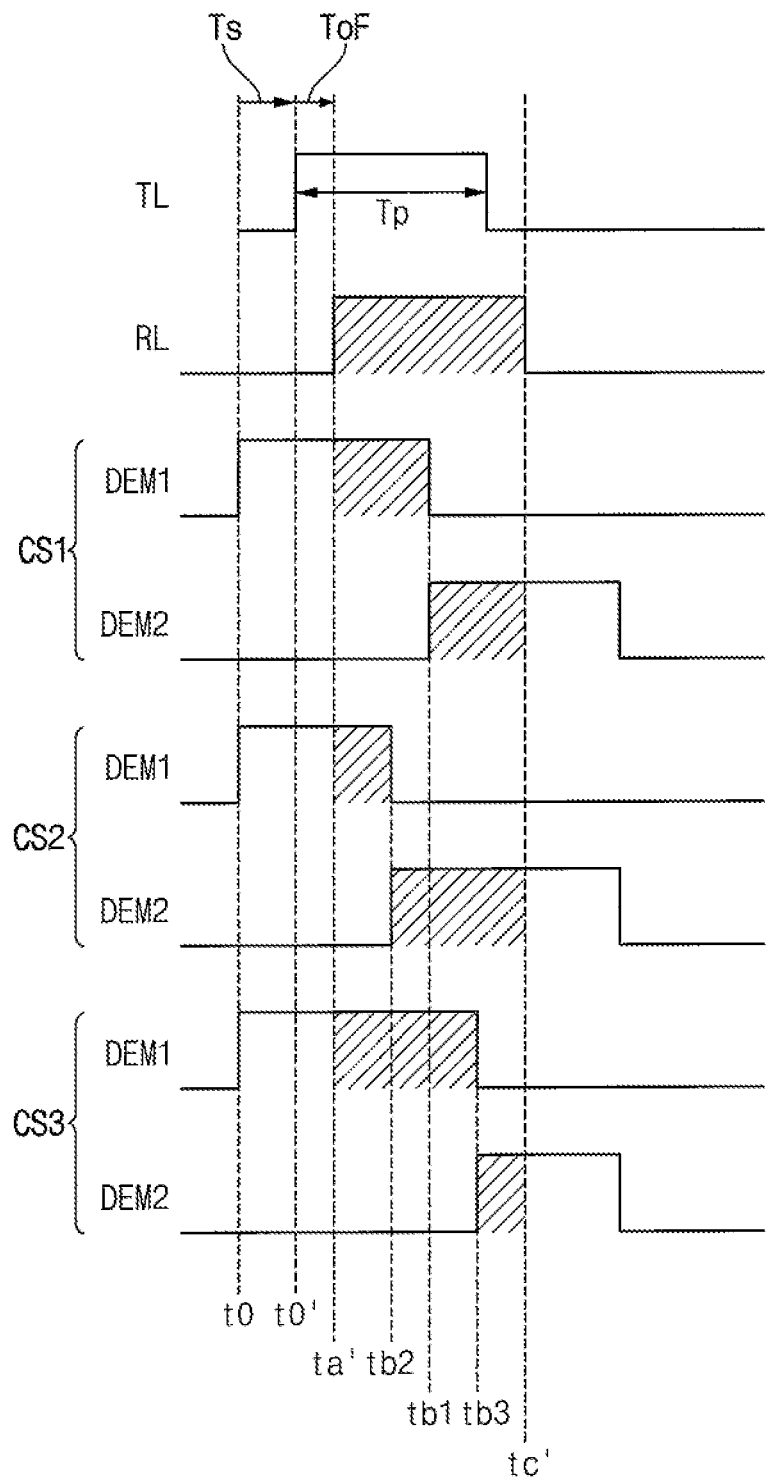
FIGS. 19 and 20 illustrate example embodiments of a time shift for distance measurement of a ToF sensor.
Figure 20:
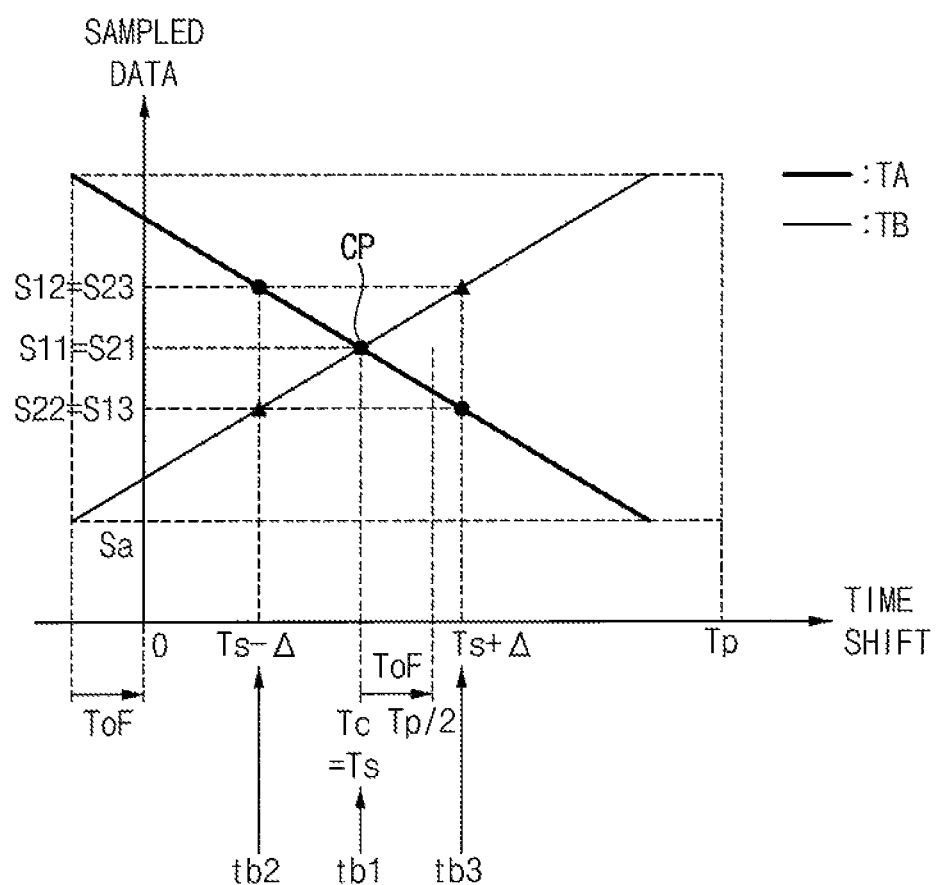

FIGS. 19 and 20 are diagrams illustrating example embodiments of a time shift for distance measurement of a ToF sensor. Referring to FIGS. 19 and 20, in these embodiments the controller 150 in FIG. 2 may control the row scanning circuit 130 to change the time shift between the transmission light TL and the demodulation signals DEM1 and DEM2. This may be accomplished by changing the pulse width or the duty ratio of the demodulation signals DEM1 and DEM2.

In FIG. 19, a first case CS1 corresponds to where the pulse width of the first demodulation signal DEM1 is equal to the pulse width of the second demodulation signal DEM2. A second case CS2 corresponds to where the pulse width of the first demodulation signal DEM1 is less than the pulse width of the second demodulation signal DEM2. A third case CS3 corresponds to where the pulse width of the first demodulation signal DEM1 is greater than the pulse width of the second demodulation signal DEM2. The areas of the hatched portions are proportional to the respective sampled data. The pulse width of the reception light RL may be divided by the first and second demodulation signals DEM1 and DEM2, at time point tb1 in the first case CS1, at time point tb2 in the second case CS2 and at time point tb3 in the third case CS3.

As illustrated in FIG. 20, the time point tb1 of the first case CS1 corresponds to the time shift Ts, the time point tb2 of the second case CS2 corresponds to the time shift Ts−Δ, and the time point tb3 of the third case CS3 corresponds to the time shift Ts+Δ. As such, the sampled data S11~S13 and S21~S23 may be obtained by changing the pulse widths or the duty ratios of the demodulation signals DEM1 and DEM2, as substantially the same results when changing the time shift. Accordingly, the time shift may be reduced by decreasing the pulse width of the first demodulation signal DEM1 applied to the first tap TA and by increasing the pulse width of the second demodulation signal DEM2 applied to the second tap TB.

Figure 21:
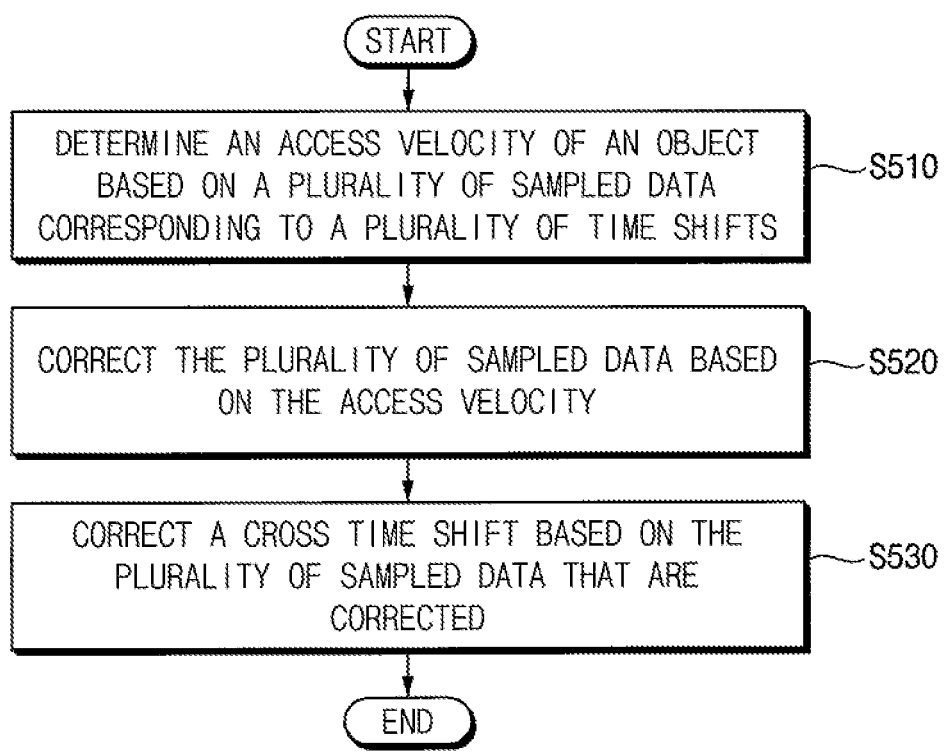
FIG. 21 illustrates an embodiment of a method of measuring a distance.
Figure 22:
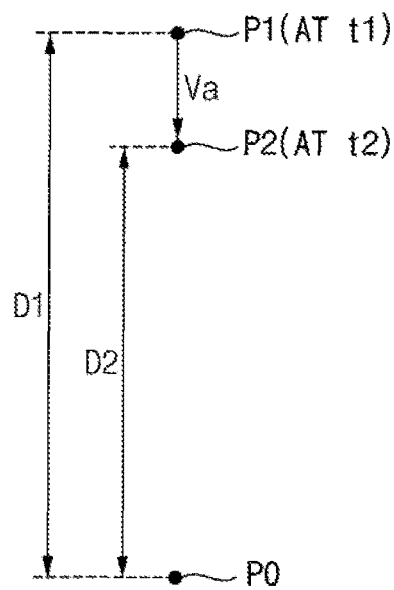
FIGS. 22 and 23 are example diagrams for describing the method of FIG. 21.
Figure 23:
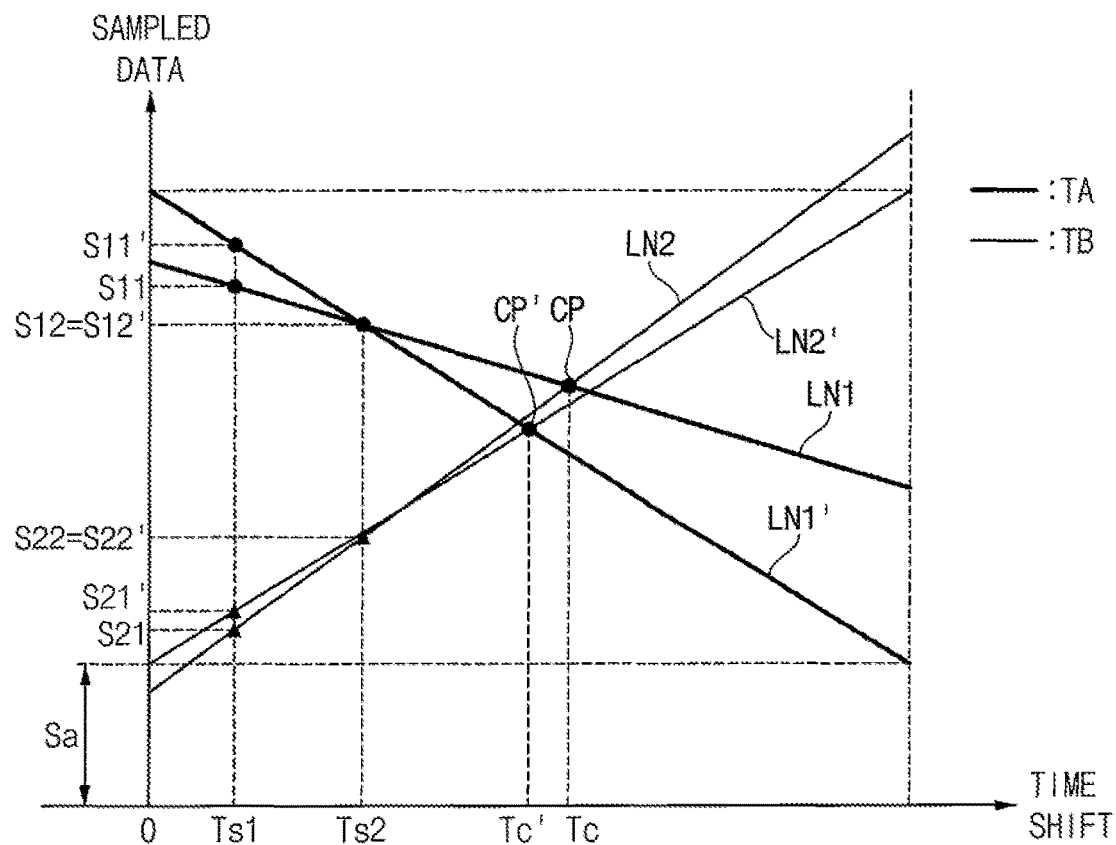

FIG. 21 is a flow chart illustrating a method of measuring a distance according to example embodiments, and FIGS. 22 and 23 are examples of diagrams for describing the method of FIG. 21.

Referring to FIG. 21, access velocity of an object may be determined based on a plurality of sampled data corresponding to a plurality of time shifts (S510). The plurality of sampled data may be corrected based on the access velocity (S520) and a cross time shift may be corrected based on the plurality of sampled data that are corrected (S530).

In FIG. 22, P0 indicates a position of the ToF sensor, P1 indicates a position of an object at time point t1 when a first sampling operation corresponding to a first time shift Ts1 is performed, and P2 indicates a position of the object at time point t2 when a second sampling operation corresponding to a second time shift Ts2 is performed. For example, when the object approaches the ToF sensor, a distance D2 at the time point t2 is less than a distance D1 at time point t1. When the object is moving, the sampled data may be varied depending on the distance between the ToF sensor and the object, and the cross time shift Tc corresponding to the cross point CP may be affected by the varying sampled data. In other words, an original cross time shift Tc (corresponding to an original cross point CP of lines LN1 and LN2 based on the sampled data S11 and S21 corresponding to the first time shift Ts1 and the sampled data S21 and S22 corresponding the second time shift Ts2) may not reflect the accurate time-of-flight. The intensity of the reception light RL reflected by the object may be inversely proportional to the square of the distance, as represented by Equation 10.

$$S11+S21=k/D1^2$$
$$S12+S22=k/D2^2 \qquad (10)$$

In Equation 10, S11+S21 corresponds to the sum of sampled data at the time point t1, S12+S22 corresponds to the sum of sampled data at the time point t2, k indicates a constant depending, for example, on a medium of propagating light, a reflection coefficient of the object, etc. The distance difference D1−D2 between the time points t1 and t2 may be obtained based on Equation 10, and an access velocity of the object may be obtained based on Equation 11.

$$Va=(D1-D2)/(t1-t2) \qquad (11)$$

FIG. 23 illustrates an example including first corrected sampled data S11' and S21', which are obtained by correcting the sampled data S11 and S21 corresponding to the first time shift Ts1 so that the corrected sampled data S11' and S21' may be normalized to the sampled data S12 and S22 corresponding to the second time shift Ts2. In this case, second corrected sampled data S12' and S22' may be equal to the sampled data S12 and S22. The corrected lines LN1' and LN2' and the corrected cross point CP' may be determined based on the first and second corrected sampled data S11', S12', S21' and S22'. The original cross time shift Tc based on the original sampled data S11, S12, S21 and S22 may be corrected to the corrected cross time shift Tc'.

Figure 24:
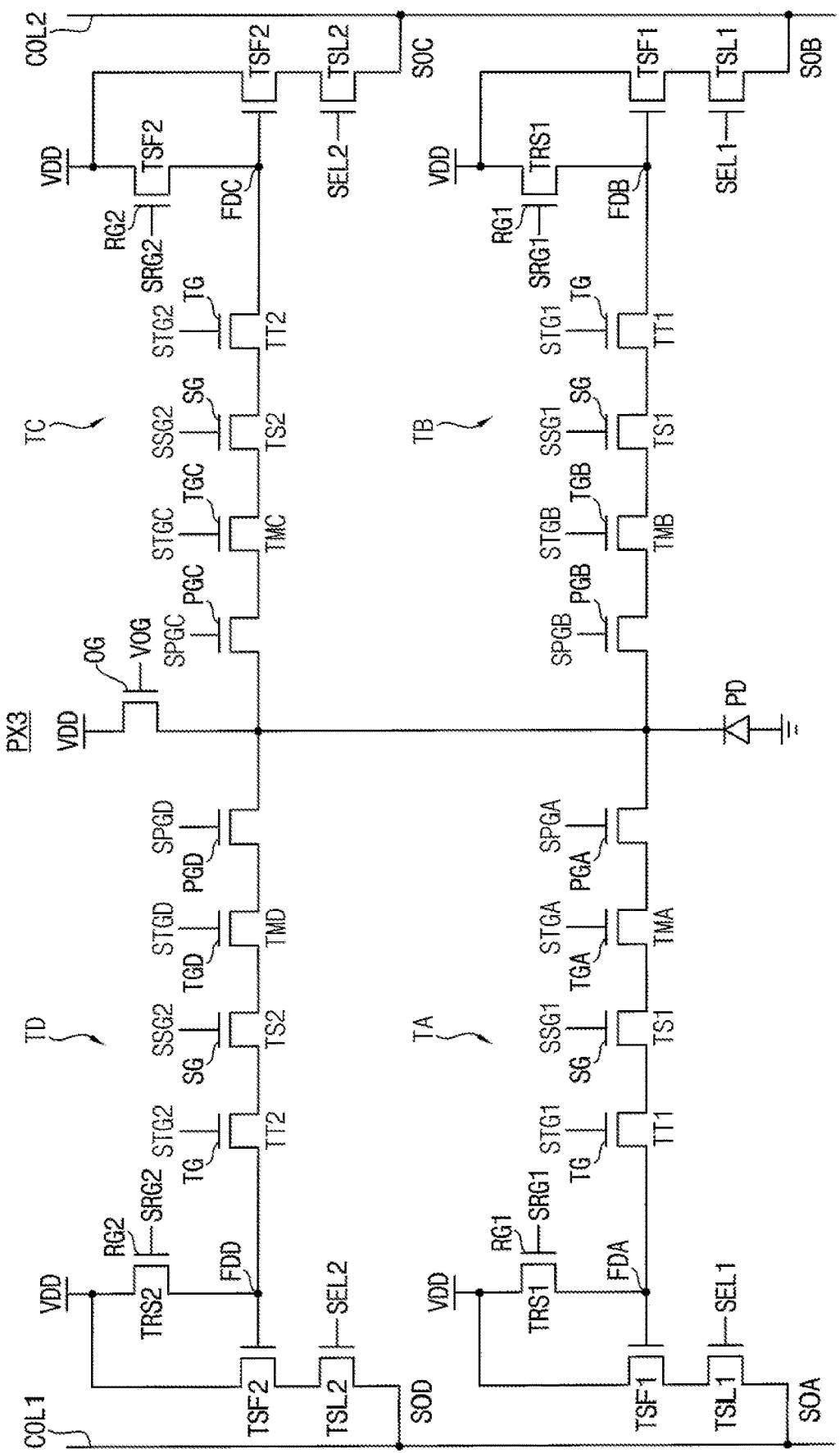
FIG. 24 illustrates a circuit embodiment of a depth pixel having a four-tap structure in a ToF sensor.
Figure 25:
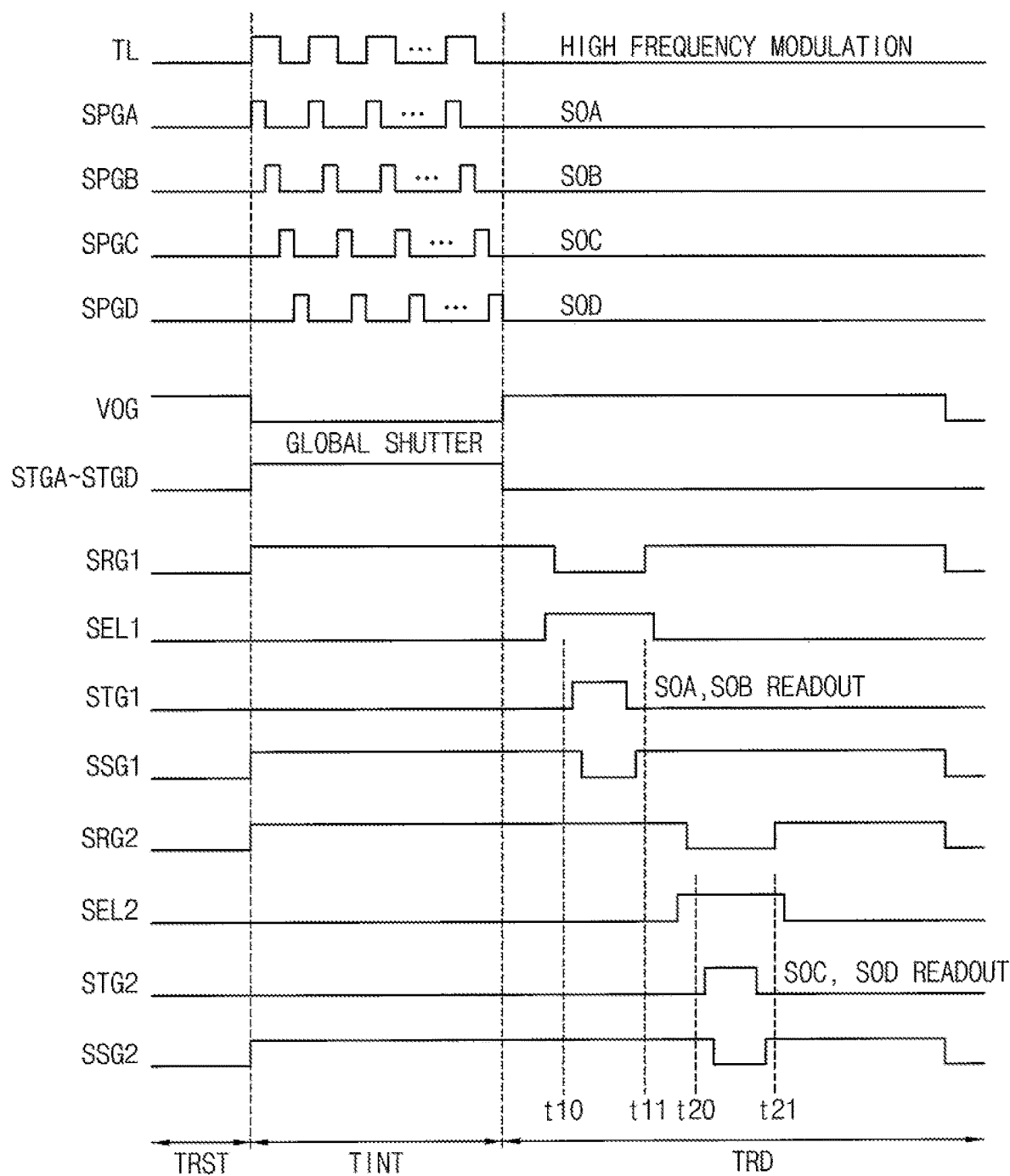
FIG. 25 illustrates an example operation of a ToF sensor including a depth pixel.

FIG. 24 is a circuit embodiment of a depth pixel PX3 having a four-tap structure in a ToF sensor. FIG. 25 is a timing diagram illustrating an example operation of a ToF sensor including the depth pixel of FIG. 24. FIG. 24 illustrates a four-tap structure in which individual photogate is applied per tap.

Referring to FIG. 24, a depth pixel PX3 may include a first photogate PGA and transistors TMA, TS1 and TT1 corresponding to a first tap TA, a second photogate PGB and transistors TMB, TS1 and TT1 corresponding to a second tap TB, a third photogate PGC and transistors TMC, TS2 and TT2 corresponding to a third tap TC, a fourth photogate PGD and transistors TMD, TS2 and TT2 corresponding to a fourth tap TD, transistors TRS1, TRS2, TSF1, TSF2, TSL1 and TSL2 corresponding to a readout circuit, and an overflow gate OG and a photodiode corresponding to a shared circuit. Each of the transistors TMA, TMB, TMC, TMD, TS1, TS2, TT1, TT2, TRS1 and TRS2 may include a gate disposed above a semiconductor substrate and source and drain regions disposed at respective sides of the gate in the semiconductor substrate. The gates of the transistors TMA, TMB, TMC, TMD, TS1, TS2, TT1, TT2, TRS1 may correspond to a first demodulation transfer gate TGA, a second demodulation transfer gate TGB, a third demodulation transfer gate TGC, a fourth demodulation transfer gate TGD, storage gates SG, FD transfer gates TG and reset gates RG1 and RG2, respectively.

First through fourth photogate signals SPGA~SPGD are applied to the first through fourth photogates PGA~PGD, an overflow gate voltage VOG is applied to the overflow gates OG, storage control signals SSG1 and SSG2 are applied to the storage gates SG1 and SG2, demodulation transfer control signals STGA~STGD are applied to the demodulation transfer gates TGA~TGD, FD transfer control signals STG1 and STG2 are applied to the FD transfer gates TG1 and TG2, reset signals SRG1 and SRG2 are applied to the reset gates RG1 and RG2, and selection signals SEL1 and SEL2 are applied to the gates of the selection transistors TSL1 and TSL2. The first through fourth photogate signals SPGA~SPGD correspond to the above-described demodulation signals having different phases.

The photogate signals SPGA~SPGD, the overflow gate voltage VOG, the demodulation transfer control signals STGA~STGD, the storage control signals SSG1 and SSG2, the FD transfer control signals STG1 and STG2, the reset signals SRG1 and SRG2, and the selection signals SEL1 and SEL2 may be provided from the row scanning circuit 130 under control of the controller 150 as described above with reference to FIG. 2.

Referring to FIGS. 2, 24 and 25, in the distance detection mode, the light source 210 may generate the transmission light TL modulated by a modulation frequency during an integration period TINT, to collect a photo charge generated by an incident light. The row scanning circuit 130 may apply the first through fourth sampling control signals (e.g., the first through fourth photogate signals SPGA~SPGD having the different phases) to the first through fourth photogates PGA~PGD corresponding to the first through fourth taps TA~TD.

The overflow voltage VOG applied to the overflow gates OG may have a turn-off voltage level VOFF to block the photo charge from being drained from the photodiode PD during the integration period TINT. The demodulation transfer control signals STGA~STGD and the storage control signals SSG1 and SSG2 are activated during the integration period TINT. Accordingly, the photo charge collected by the first through fourth photogate signals SPGA~SPGD may be stored in the semiconductor substrate under the storage gates SG1 and SG2, respectively.

During other periods (e.g., a reset period TRST to initialize the depth pixel PX1 and a readout period TRD to measure an amount of the photo charge collected during the integration period TINT), the overflow gate voltage VOG may have a turn-on voltage level VON to drain the photo charge from the photodiode PD. The collected photo charge may be drained to the terminal of the power supply voltage VDD during the periods TRST and TRD other than the integration period TINT. As such, a global shutter function may be implemented using the overflow gates OG.

At a first time point t10, during the readout period TRD when the reset signal SRG1 is deactivated and the selection signal SEL1 is activated, first and second reset state data of the first and second taps TA and TB may be output through the column lines COL1 and COL2, respectively. At a second time point t11, during the readout period TRD when the FD transfer control signal STG1 is activated and the storage control signal SSG1 is deactivated, the photo charge stored by the storage gates SG may be transferred to the floating diffusion regions FDA and FDB and the first and second sampled data SOA and SOB of the first and second taps TA and TB may be output through the column lines COL1 and COL2, respectively.

At a third time point t20, during the readout period TRD when the reset signal SRG2 is deactivated and the selection signal SEL2 is activated, third and fourth reset state data of the third and fourth taps TC and TD may be output through the column lines COL1 and COL2, respectively. At a fourth time point t21, during the readout period TRD when the FD transfer control signal STG2 is activated and the storage control signal SSG2 is deactivated, the photo charge stored by the storage gates SG may be transferred to the floating diffusion regions FDC and FDD and the third and fourth sampled data SOC and SOD of the third and fourth taps TC and TD may be output through the column lines COL1 and COL2, respectively.

Figure 26:
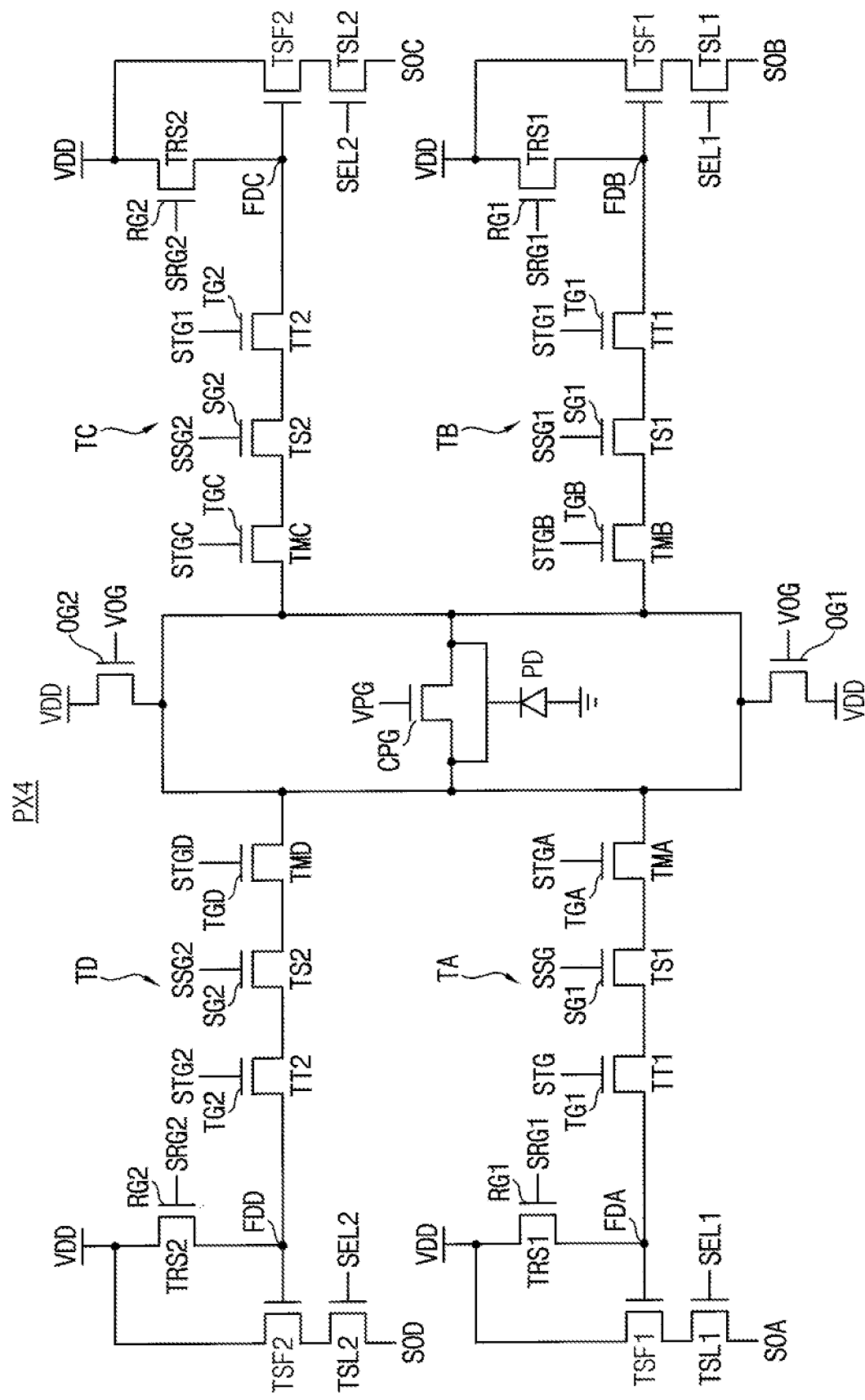
FIG. 26 illustrates a circuit embodiment of a depth pixel having a four-tap structure in a ToF sensor.
Figure 27:
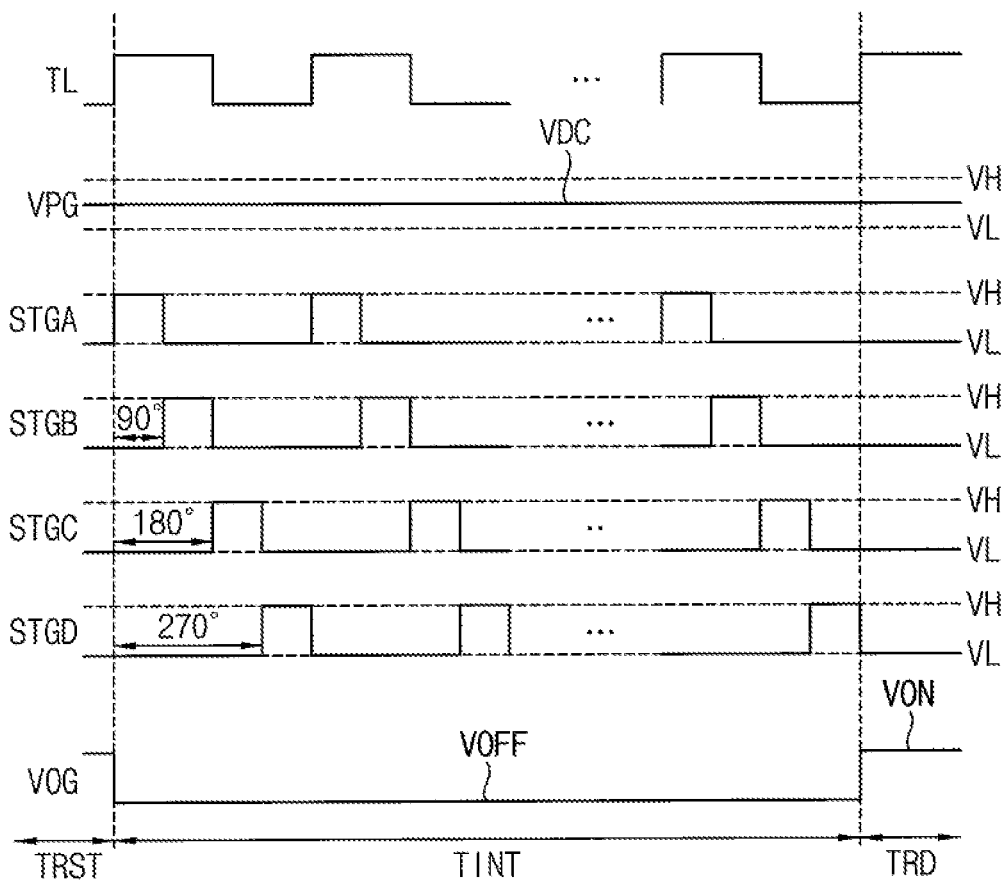
FIG. 27 illustrates an example operation of a ToF sensor including a depth pixel.

FIG. 26 is a circuit embodiment of a depth pixel having a four-tap structure in a ToF sensor. FIG. 27 is a timing diagram illustrating an example operation of a ToF sensor including the depth pixel of FIG. 26. A depth pixel PX4 of FIG. 26 may be similar to the depth pixel PX3 of FIG. 24.

Referring to FIG. 26, the depth pixel PX4 includes a common photogate CPG (instead of the first through fourth photogates PGA~PGD of the depth pixel PX3 of FIG. 24). In the case of depth pixel PX4 of FIG. 26, the first through fourth demodulation transfer control signal STGA~STGD may correspond to the above-described demodulation signals.

Referring to FIGS. 26 and 27, during the integration period TINT, a photogate voltage VPG applied to the common photogate CPG may have a DC voltage level VDC that causes collecting of the photo charge. The overflow gate voltage VOG applied to the overflow gates OG1 and OG2 may have a turn-off voltage level VOFF that causes draining of the photo charge to be blocked. The DC voltage level VDC may be a voltage level between a first predetermined (e.g., high) voltage level VH of the demodulation signals STGA~STGD and a second predetermined (e.g., low) voltage level VL of the demodulation signals STGA~STGD.

In addition, during the integration period TINT, the first through fourth demodulation signals STGA~STGD of different phases may be applied to the first through fourth demodulation transfer gates TGA~TGD, respectively. In one example embodiment, the phase difference between the first and second demodulation signals STGA and STGB may be about 90 degrees, the phase difference between the first and third demodulation signals STGA and STGC may be about 180 degrees, and the phase difference between the first and fourth demodulation signals STGA and STGD may be about 270 degrees.

Figure 28:
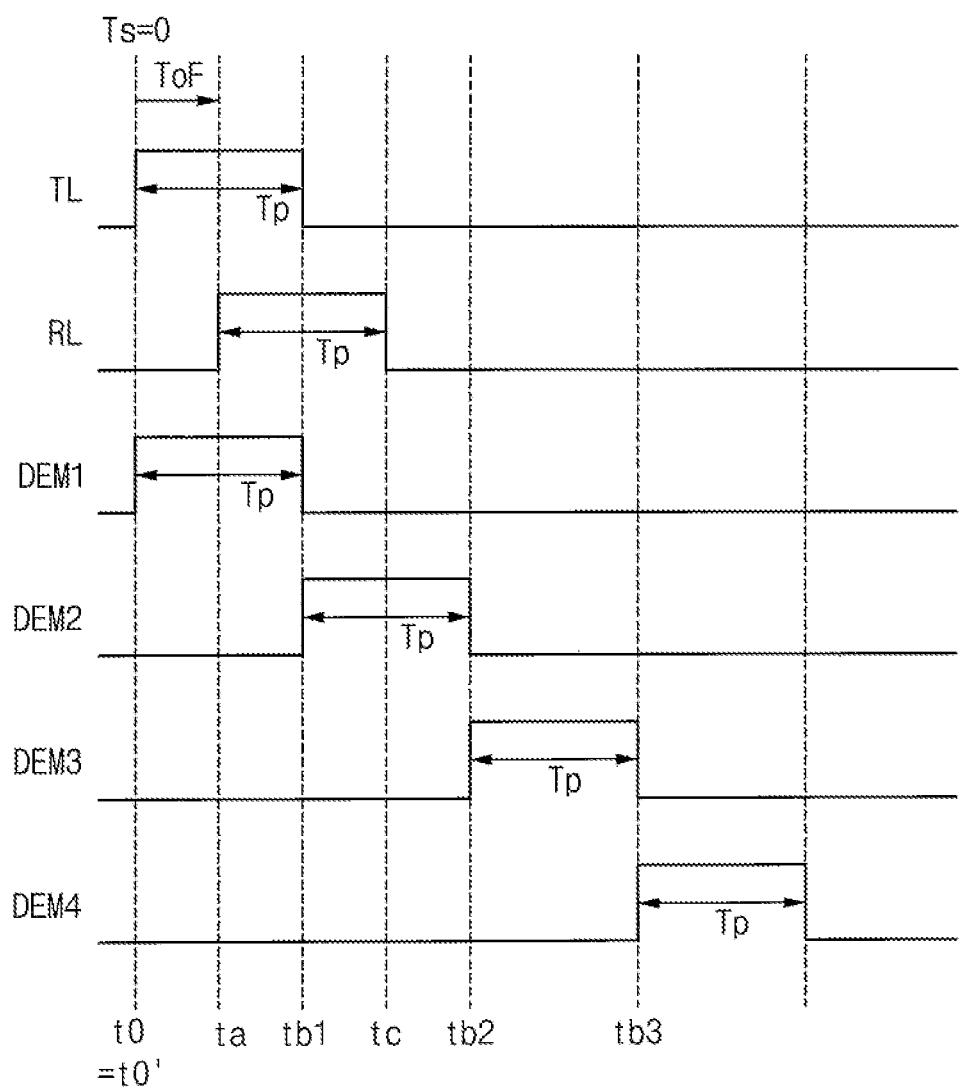
FIGS. 28 and 29 illustrate embodiments of a time shift of a ToF sensor.
Figure 29:
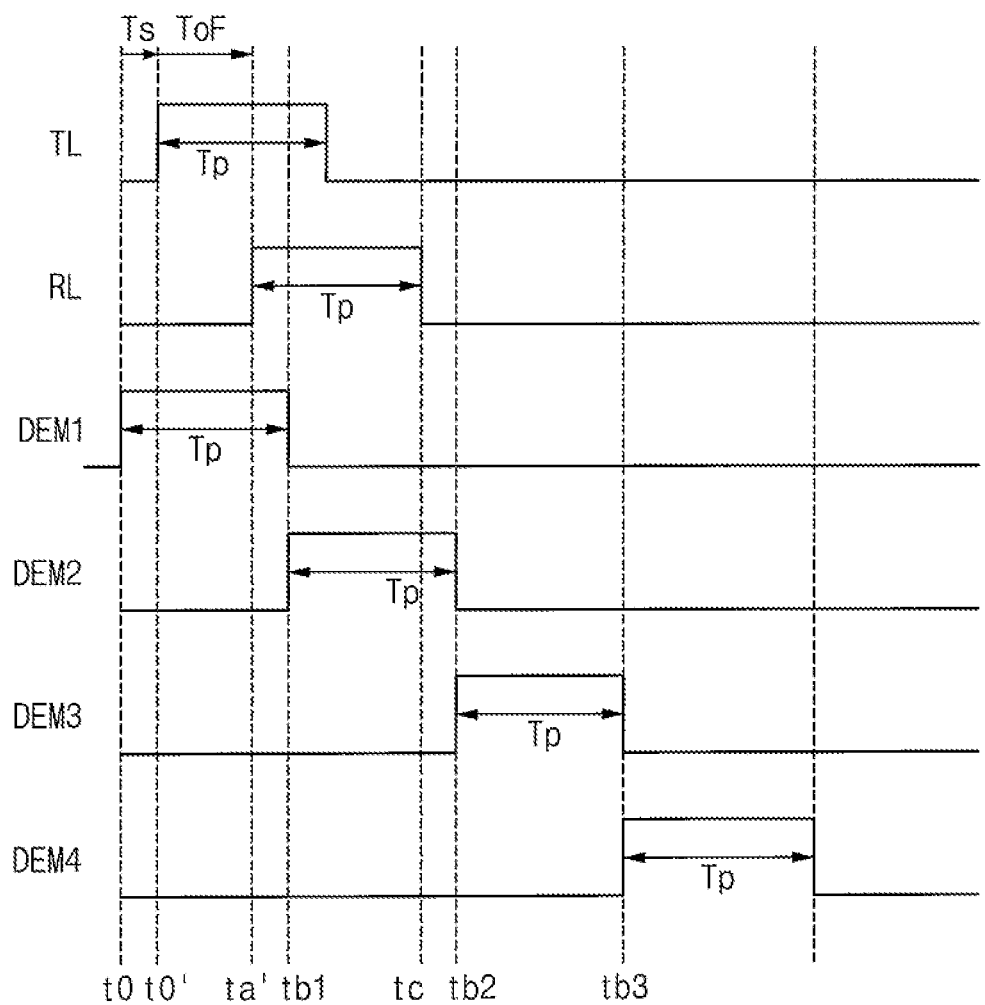

FIGS. 28 and 29 are diagrams illustrating a time shift of a ToF sensor according to example embodiments. In FIGS. 28 and 29, the following are illustrated with respect to the four-tap structure: timings of a transmission light TL, a reception light RL corresponding to an arbitrary time-of-flight ToF, and first through fourth demodulation signals DEM1~DEM4 corresponding to first through fourth taps. FIG. 28 illustrates a case that a time shift Ts is zero and FIG. 29 illustrates a case that the time shift Ts has a positive value.

Referring to FIGS. 28 and 29, a pulse width of the transmission light TL and pulse widths of the plurality of demodulation signals may be substantially equal to each other as a reference time Tp. The falling edge of the first demodulation signal DEM1 and the rising edge of the second demodulation signal DEM2 may be synchronized at time point tb1, the falling edge of the second demodulation signal DEM2 and the rising edge of the third demodulation signal DEM3 may be synchronized at time point tb2, and the falling edge of the third demodulation signal DEM3 and the rising edge of the fourth demodulation signal DEM4 may be synchronized at time point tb3.

The pulse of the reception light RL may be divided at the time point tb1 by the pulse of the first demodulation signal DEM1 and the second demodulation signal DEM2, for example, as illustrated in FIGS. 28 and 29. In this case, the first tap may correspond to the first reference tap and the second tap may correspond to the second reference tap. Depending on the ToF, the pulse of the reception light RL may be divided at the time point tb2 by the pulse of the second demodulation signal DEM2 and the third demodulation signal DEM3, or the pulse of the reception light RL may be divided at the time point tb3 by the pulse of the third demodulation signal DEM3 and the fourth demodulation signal DEM4. In some example embodiments, the pulse widths of the first through fourth demodulation signals DEM1~DEM4 may be set to be different from each other.

When the time shift Ts is zero as illustrated in FIG. 28, time point t0' corresponding to the rising edge of the transmission light TL may coincide with time point t0 corresponding to the rising edge of the first demodulation signal DEM1. In contrast, when the time shift Ts has a positive value as illustrated in FIG. 29, time point t0' corresponding to the rising edge of the transmission light TL may lag behind time point t0 corresponding to the rising edge of the first demodulation signal DEM1. Time point t0' corresponding to the rising edge of the transmission light TL may precedes time point t0 corresponding to the rising edge of the first demodulation signal DEM1 when the time shift Ts has a negative value.

A first sampling operation may be performed by setting the time shift Ts to be zero as illustrated in FIG. 28. In this case, the sampled data by the first demodulation signal DEM1 corresponds to (tb1−ta) and the sampled data by the second demodulation signal DEM2 corresponds to (tc−tb1). A second sampling operation may be performed by setting the time shift Ts to be a positive value as illustrated in FIG. 29. In this case, the sampled data by the first demodulation signal DEM1 corresponds to (tb1−ta') and the sampled data by the second demodulation signal DEM2 corresponds to (tc'−tb1). As such, based on a plurality of sampled data corresponding to a plurality of time shifts, the cross time shift may be determined, for example, as described with reference to FIGS. 7 and 8F.

In some example embodiments, the time shift Ts may be changed by changing the delay amount (or phase) of the transmission light TL and/or the delay amount of the demodulation signals DEM1~DEM4. The light source 210 and/or the row scanning circuit 130 in FIG. 2 may include or be coupled to a delay circuit to adjust the phase of the transmission light TL and/or the demodulation signals DEM1~DEM4 based on control signals from the controller 150. The time shift Ts may be increased by increasing the delay amount of the transmission light TL or by decreasing the delay amount of the demodulation signals DEM1~DEM4. In other words, the time shift Ts may be decreased by decreasing the delay amount of the transmission light TL or by increasing the delay amount of the demodulation signals DEM1~DEM4.

Figure 30:
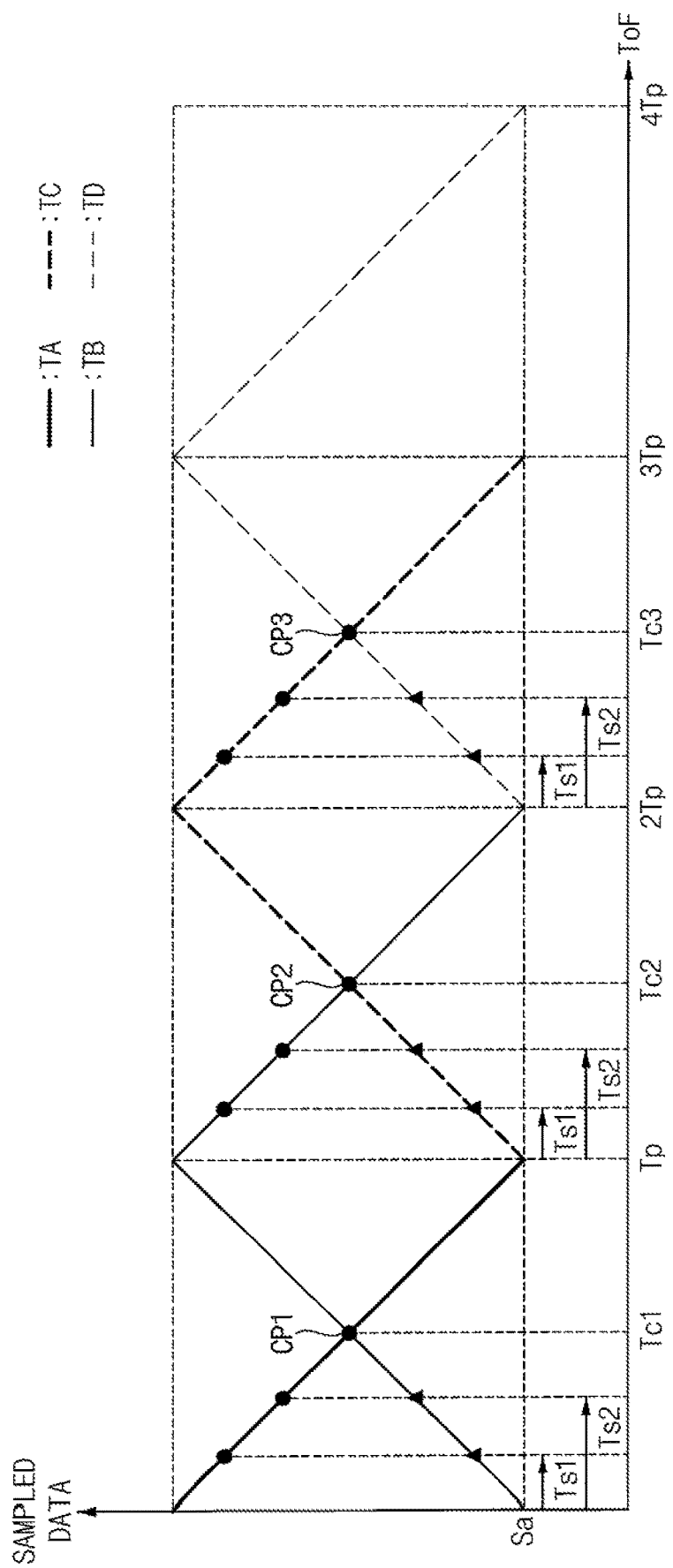
FIG. 30 illustrates an example of sampled data according to a time shift of a ToF sensor.

FIG. 30 is a diagram illustrating sampled data according to a time shift of a ToF sensor according to example embodiments. Referring to FIG. 30, when the ToF is between zero and Tp, a cross time shift Tc1 corresponding to a cross point CP1 may be determined based on sampled data corresponding to time shifts Ts1 and Ts2 of the first tap TA and the second tap TB. In other words, the first tap TA corresponds to the first reference tap and the second tap TB corresponds to the second reference tap when the ToF is between zero and Tp.

When the ToF is between Tp and 2Tp, a cross time shift Tc2 corresponding to a cross point CP2 may be determined based on sampled data corresponding to time shifts Tp+Ts1 and Tp+Ts2 of the second tap TB and the third tap TC. In other words, the second tap TB corresponds to the first reference tap and the third tap TC corresponds to the second reference tap when the ToF is between Tp and 2Tp.

When the ToF is between 2Tp and 3Tp, a cross time shift Tc3 corresponding to a cross point CP3 may be determined based on sampled data corresponding to time shifts 2Tp+Ts1 and 2Tp+Ts2 of the third tap TC and the fourth tap TD. In other words, the third tap TC corresponds to the first reference tap and the fourth tap TD corresponds to the second reference tap when the ToF is between 2Tp and 3Tp.

As such, when the depth pixel has the four-tap structure including the first through fourth taps, one of the first through forth taps TA~TD may be determined as the first reference tap and another one of the first through forth taps TA~TD may be determined as the second reference tap, depending on the distance between the ToF sensor and the object.

When the depth pixel has the four-tap structure, the sampled data of the first and second reference taps may be corrected based on the sampled data of the two taps except the first and second reference taps among the first through fourth taps TA~TD. For example, when the ToF is between Tp and 2Tp in FIG. 30, the second tap TB corresponds to the first reference tap and the third tap TC corresponds to the second reference tap when the ToF is between Tp and 2Tp. In this case, the sampled data of the first tap TA and the fourth tap TD correspond to the reference sampled data Sa. The corrected sampled data may be obtained by subtracting the reference sampled data Sa of the first and fourth taps TA and TD from the sampled data of the second and third taps TB and TC corresponding to the first and second reference taps. Accuracy of the distance measurement may therefore be further enhanced based on the corrected sampled data.

Figure 31:
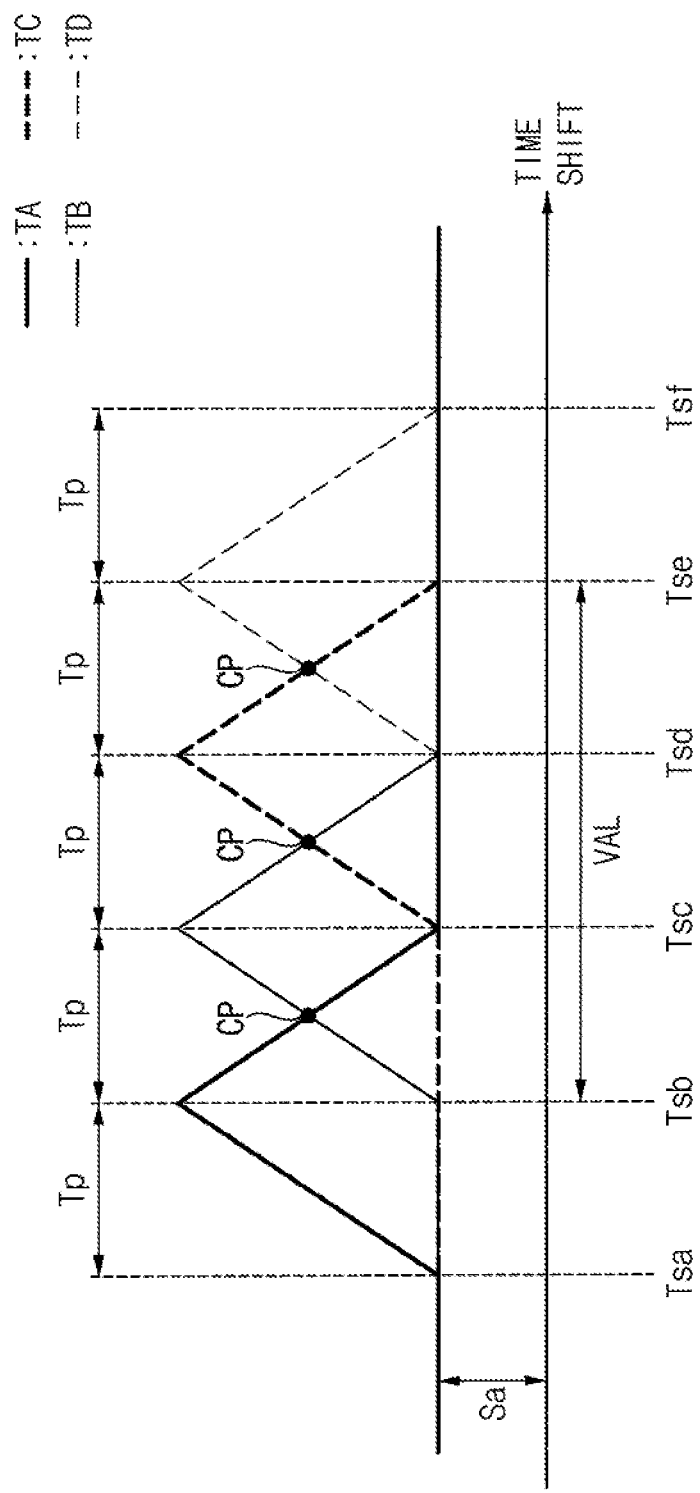
FIG. 31 illustrates an embodiment of a scanning method of a basic time shift of a ToF sensor.

FIG. 31 is a diagram illustrating a scanning method of a basic time shift of a ToF sensor according to example embodiments. In FIG. 31, the first through fourth sampled data are illustrated to correspond to the first through fourth taps TA~TD, respectively, which are sampled according to a time shift.

In a region where the time shift is less than Tsa, the first through fourth sampled data may maintain a value corresponding to the reference sampled data Sa.

In a region where the time shift is between Tsa and Tsb, the first sampled data may increase and the second through third sampled data may maintain values corresponding to the reference sampled data Sa.

In a region where the time shift is between Tsb and Tsc, the first sampled data may decrease, the second sampled data may increase and the third and fourth sampled data may maintain values corresponding to the reference sampled data Sa.

In a region where the time shift is between Tsc and Tsd, the second sampled data may decrease, the third sampled data may increase and the first and fourth sampled data may maintain values corresponding to the reference sampled data Sa.

In a region where the time shift is between Tsd and Tse, the third sampled data may decrease, the fourth sampled data may increase and the first and second sampled data may maintain values corresponding to the reference sampled data Sa.

In a region where the time shift is between Tse and Tsf, the first through third sampled data may maintain values corresponding to the reference sampled data Sa and the fourth sampled data may decrease.

In a region where the time shift is greater than Tsf, the first through fourth sampled data maintain values corresponding to reference sampled data Sa As a result, the region where the time shift is between Tsb and Tse may correspond to a valid region VAL in which a cross point CP may exist. As such, the basic time shift may be searched for to place a pulse of the reception light RL in a sampling range SPL, so that the reception light RL may be sampled by the demodulation signals DEM1 and DEM2, for example, in accordance with the embodiments of FIGS. 15 and 16.

Figure 32:
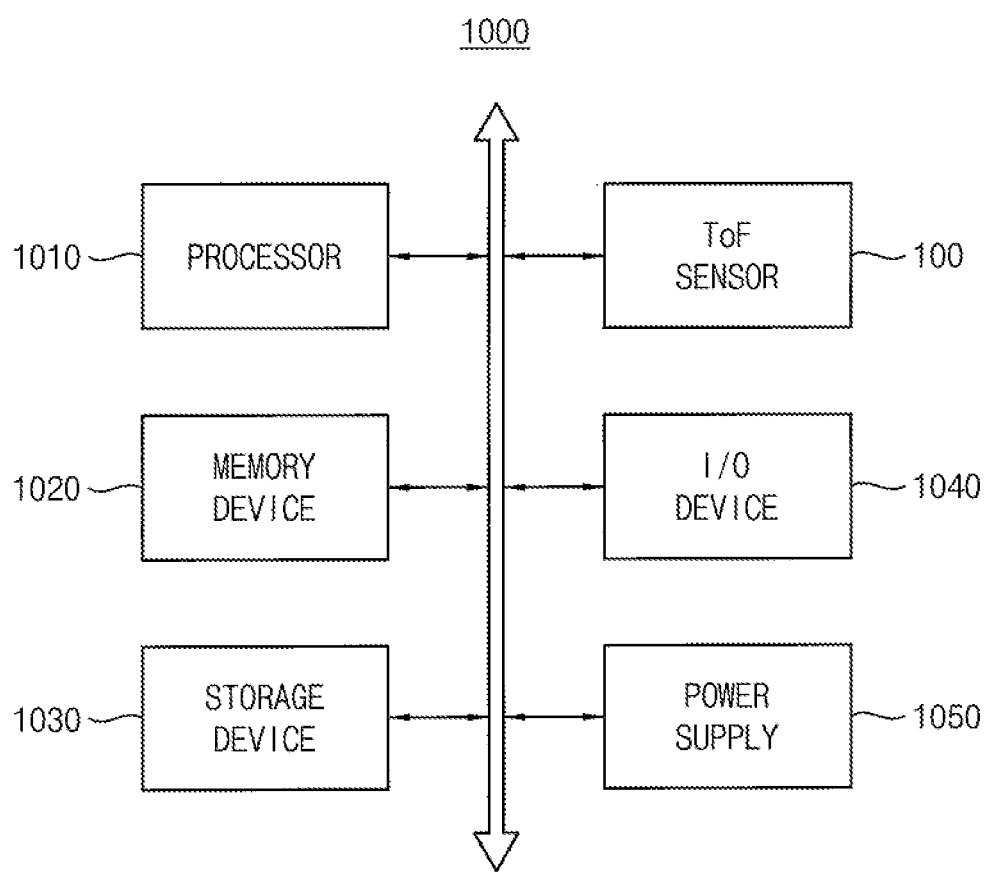
FIG. 32 illustrates an embodiment of a computing system including a ToF sensor.

FIG. 32 is a block diagram illustrating a computing system 1000 including a ToF sensor according to example embodiments.

Referring to FIG. 32, the computing system 1000 includes a processor 1010, a memory device 1020, a storage device 1030, an input/output device 1040, a power supply 1050 and/or a ToF sensor 100. In an embodiment, the computing system 1000 may further include a port for communicating with electronic devices such as, for example, a video card, a sound card, a memory card, a USB device, etc.

The processor 1010 may perform specific calculations and/or tasks and, for example, may be a microprocessor, a central process unit (CPU), a digital signal processor, or another type of processing architecture. The processor 1010 may communicate with the memory device 1020, the storage device 1030 and the input/output device 1040 via an address bus, a control bus and/or a data bus. The processor 1010 may be coupled to an extension bus such as, for example, a peripheral component interconnect (PCI) bus. The memory device 1020 may store data for operating the computing system 1000.

The memory device 1020 may be implemented, for example, as a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The storage device 1030 may include, for example, a solid state drive, a hard disk drive, a CD-ROM, or the like. The input/output device 1040 may include an input device such as, for example, a keyboard, a mouse, a keypad, etc., and an output device such as, for example, a printer, a display device, or the like. The power supply 1050 may supply power to the computing device 1000.

The ToF sensor 100 may be coupled to the processor 1010 via one or more of the buses and/or one or more other communication links. The ToF sensor 100 may be integrated with the processor 1010 in the same chip, or the ToF sensor 100 and the processor 1010 may be integrated in respective chips. In accordance with the embodiments described herein, the ToF sensor 100 may enhance the accuracy of a distance measurement using a cross time shift determined based on sampled data corresponding to different time shifts.

In accordance with one embodiment, an apparatus includes a storage area and at least one processor. The apparatus may correspond to a time-of-flight sensor or one or more elements of a time-of-flight sensor. The one or more elements may include, for example, controller 150 shown in FIG. 1 or one or more other elements of the embodiments described herein. The at least one processor may include controller 150, the sensing unit, and/or a processor coupled to the time-of-flight sensor. When the at least one processor includes controller 150, the storage area may correspond, for example, to storage area 151 shown in FIG. 1 or may be a storage area at another location.

The storage area is configured to store instructions to be executed by the at least one processor. The storage area may be a non-transitory computer readable medium, e.g., a volatile or non-volatile memory. When the instructions are executed, the at least one processor may perform operations corresponding to any of the embodiments described herein. For example, in one embodiment, the at least one processor may execute the instructions to generate time shifts between transmission light and demodulation signals, generate sampled data corresponding to the time shifts, determine a cross time shift based on the sampled data of a first reference tap substantially equaling sampled data of a second reference tap, and determining a distance between a time-of-flight sensor and an object based on the cross time shift. The transmission light may be output from the time-of-flight sensor which includes the first reference tap and the second reference tap, and may illuminate the object as described herein. Also, as described in accordance with the aforementioned embodiments, the demodulation signals and the sampled data may be derived based on the transmission light reflected from the object (e.g., the reception light). The demodulation signals may have different phases as previously described.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, converters, devices, sensors, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, units, converters, devices, sensors, multiplexers, generators, logic, interfaces, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, converters, devices, sensors, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Embodiments of the inventive concept may be applied to any electronic device and system. Examples include, but are not limited to, a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a navigation system for a vehicle, a monitoring system, an auto focusing system, a tracking system, a motion detection system, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A method of measuring a distance using a time-of-flight (ToF) sensor configured to receive reflected light from an object as reception light, the ToF sensor including at least one depth pixel and a light source configured to illuminate the object with a transmission light, the at least one depth pixel having a multi-tap structure including a plurality of taps configured to generate a plurality of sampled data, wherein generating the sampled data is based on the reception light and is based on a plurality of demodulation signals having different phases applied to the at least one depth pixel, the method comprising:
generating a plurality of time shifts between the transmission light and the plurality of demodulation signals;
performing a plurality of sampling operations to generate the plurality of sampled data corresponding to the plurality of time shifts;
determining a cross time shift based on the plurality of sampled data corresponding to the plurality of time shifts, such that the sampled data of a first reference tap and a second reference tap among the plurality of taps become substantially equal to each other with respect to the cross time shift; and
determining a distance between the ToF sensor and the object based on the cross time shift.

2. The method of claim 1, wherein generating the plurality of time shifts includes:
changing a delay amount of the transmission light, or
changing a delay amount of the plurality of demodulation signals.

3. The method of claim 1, wherein generating the plurality of time shifts includes:
changing pulse widths of the demodulation signals.

4. The method of claim 1, wherein determining the cross time shift includes:
determining, based on the sampled data of the first reference tap, a first trend line of sampled data with respect to time shift;
determining, based on the sampled data of the second reference tap, a second trend line of sampled data with respect to time shift;
determining a cross point of the first trend line and the second trend line as corresponding to the cross time shift.

5. The method of claim 1, further comprising:
determining a time shift for placing a pulse of the reception light in a sampling range such that the reception light is sampled by the plurality of demodulation signals.

6. The method of claim 1, further comprising:
changing a time shift between the demodulation signals during a single integration period, to collect a photo charge generated by an incident light.

7. The method of claim 1, further comprising:
determining an access velocity of the object based on the plurality of sampled data corresponding to the plurality of time shifts.

8. The method of claim 7, further comprising:
correcting the plurality of sampled data based on the access velocity; and correcting the cross time shift based on the plurality of corrected sampled data.

9. The method of claim 1, wherein:
the at least one depth pixel has a two-tap structure including a first tap and a second tap, and the first tap corresponds to the first reference tap and the second tap corresponds to the second reference tap, regardless of the distance between the ToF sensor and the object.

10. The method of claim 1, wherein:
the at least one depth pixel has a four-tap structure including first through fourth taps, and one of the first through fourth taps is determined as the first reference tap and
another one of the first through fourth taps is determined as the second reference tap, depending on the distance between the ToF sensor and the object.

11. The method of claim 10, further comprising:
correcting the sampled data of the first and second reference taps based on the sampled data of two taps, except the first and second reference taps among the first through fourth taps.

12. The method of claim 1, wherein each of the transmission light and the plurality of demodulation signals use a substantially equal pulse width as a reference time.

13. The method of claim 12, wherein generating the plurality of time shifts includes:
setting a difference between two time shifts among the plurality of time shifts to be less than a half of the reference time.

14. The method of claim 1, wherein:
the transmission light is a pulsed wave having a duty ratio lower than 0.5, and
the method includes measuring, by the ToF sensor, a distance between zero and $c/(2*fm)$, where c is light velocity and fm is a modulation frequency of the transmission light.

15. The method of claim 1, wherein:
the transmission light is a wave having a duty ratio of 0.5, and
the method includes measuring, by the ToF sensor, a distance between zero and $c*Tp$, where c is light velocity and Tp is a reference time corresponding to a pulse width of the transmission light.

16. A method of measuring a distance using a time-of-flight (ToF) sensor configured to receive reflected light from an object as reception light, the ToF sensor including at least one depth pixel and a light source configured to illuminate the object with a transmission light, the at least one depth pixel having a multi-tap structure including a plurality of taps configured to generate a plurality of sampled data, wherein generating the sampled data is based on the reception light and is based on a plurality of demodulation signals having different phases applied to the at least one depth pixel, the method comprising:
generating a first time shift between the transmission light and the plurality of demodulation signals;
performing a first sampling operation to generate first sampled data corresponding to the first time shift;
generating a second time shift between the transmission light and the plurality of demodulation signals;
performing a second sampling operation to generate second sampled data corresponding to the second time shift;
determining a cross time shift based on the first and second sampled data, such that sampled data of a first reference tap and a second reference tap among the plurality of taps become substantially equal to each other with respect to the cross time shift; and
determining a distance between the ToF sensor and the object based on the cross time shift.

17. The method of claim 16, wherein determining the cross time shift includes:
determining, based on the sampled data of the first reference tap, a first trend line of sampled data with respect to time shift;
determining, based on the sampled data of the second reference tap, a second trend line of sampled data with respect to time shift;
determining a cross point of the first trend line and the second trend line as corresponding to the cross time shift.

18. A time-of-flight (ToF) sensor, comprising:
a light source configured to illuminate an object with a transmission light;
a sensor configured to receive reflected light from the object as reception light and including a pixel array and a row scanning circuit, the pixel array including one or more depth pixels, each of the one or more depth pixels having a multi-tap structure including a plurality of taps configured to generate a plurality of sampled data, wherein generating the sampled data is based on the reception light and is based on a plurality of demodulation signals having different phases applied to the one or more depth pixels, the row scanning circuit configured to generate the plurality of demodulation signals applied to the plurality of taps; and
a controller configured to:
perform a plurality of sampling operations, by applying the plurality of demodulation signals having a plurality of time shifts with respect to the transmission light to generate the plurality of sampled data corresponding to the plurality of time shifts;
determine a cross time shift based on the plurality of sampled data corresponding to the plurality of time shifts, such that the sampled data of a first reference tap and a second reference tap among the plurality of taps become substantially equal to each other with respect to the cross time shift, and
determine a distance between the ToF sensor and the object based on the cross time shift.

19. The ToF sensor of claim 18, wherein the controller is configured to control the light source to change a delay amount of the transmission light to generate the plurality of time shifts.

20. The ToF sensor of claim 18, wherein the controller is configured to control the row scanning circuit to change at least one of a delay amount or pulse widths of the plurality of demodulation signals.

* * * * *